United States Patent [19]

Richter et al.

[11] Patent Number: 5,051,094
[45] Date of Patent: Sep. 24, 1991

[54] G-FORCE TRAINER

[75] Inventors: Bernhard H. Richter, Holland; Shabbir H. Merchant, Warminster; Andreas Richter, Holland, all of Pa.

[73] Assignee: Environmental Tectonics Corporation, Southampton, Pa.

[21] Appl. No.: 149,988

[22] Filed: Jan. 26, 1988

Related U.S. Application Data

[63] Continuation-in-part of Ser. No. 108,951, Oct. 14, 1987, abandoned.

[51] Int. Cl.⁵ .............................................. G09B 09/08
[52] U.S. Cl. ........................................ 434/30; 434/59; 434/38; 434/43; 434/49; 434/35
[58] Field of Search ........................ 434/30, 59, 55, 46, 434/58, 43, 44, 38, 49, 35

[56] References Cited

U.S. PATENT DOCUMENTS

| | | |
|---|---|---|
| 1,071,101 | 8/1913 | Shaffer . |
| 1,295,145 | 2/1919 | Fisher . |
| 1,906,443 | 5/1933 | Bisch . |
| 1,912,721 | 6/1933 | Pardue et al. . |
| 1,925,180 | 9/1933 | Eyerly . |
| 1,941,024 | 12/1933 | Stanzel . |
| 2,031,310 | 2/1936 | Hall . |
| 2,239,542 | 4/1941 | Stanzel . |
| 2,312,533 | 3/1943 | Eyerly . |
| 2,357,481 | 9/1944 | Mallon .................................. 434/55 |
| 2,439,168 | 4/1948 | Kail . |
| 2,687,580 | 8/1954 | Dehmel . |
| 2,726,085 | 12/1955 | Brand . |
| 2,896,947 | 7/1959 | Jacobs . |
| 3,010,219 | 11/1961 | Schueller . |
| 3,083,473 | 4/1963 | Luton . |
| 3,085,354 | 4/1963 | Rasmussen et al. . |
| 3,136,075 | 6/1964 | Brian . |
| 3,196,557 | 7/1965 | Davidsen et al. . |
| 3,209,468 | 10/1965 | Frisch . |
| 3,221,419 | 12/1965 | Cohen . |
| 3,270,440 | 9/1966 | Radosevic, Jr. . |
| 3,281,962 | 11/1966 | Pancoe . |
| 3,340,619 | 9/1967 | Bertin .................................. 434/59 |
| 3,459,422 | 8/1969 | Winton . |
| 3,619,911 | 11/1971 | Pancoe . |
| 3,732,630 | 5/1973 | Crosbie et al. ...................... 434/40 |
| 3,760,510 | 9/1973 | Anderson, Jr. . |
| 3,824,707 | 7/1974 | Ashworth et al. . |
| 3,829,988 | 8/1974 | Burny . |
| 3,886,334 | 5/1975 | Cummings et al. . |
| 3,983,640 | 10/1976 | Cardullo et al. . |
| 4,066,256 | 1/1978 | Trumbull . |
| 4,164,080 | 8/1979 | Koysdar et al. . |
| 4,199,875 | 4/1980 | Barbarasch . |
| 4,243,024 | 1/1981 | Crosbie et al. ...................... 128/1 A |
| 4,244,120 | 1/1981 | Harris ................................ 434/59 |
| 4,313,726 | 2/1982 | Chase ................................. 434/43 |
| 4,347,055 | 8/1982 | Geiger ................................ 434/30 |
| 4,348,184 | 9/1982 | Moore ................................ 434/42 |
| 4,417,706 | 11/1983 | Miller ................................. 244/2 |
| 4,475,132 | 10/1984 | Rodesch ............................. 358/342 |
| 4,504,233 | 3/1985 | Galus et al. ......................... 434/45 |
| 4,512,745 | 4/1985 | Mohon et al. ...................... 434/43 |
| 4,518,360 | 5/1985 | Fisher et al. ....................... 434/20 |
| 4,527,980 | 7/1985 | Miller ................................. 434/55 |
| 4,710,128 | 12/1987 | Wachsmuth et al. ............... 434/46 |
| 4,751,662 | 6/1988 | Crosbie et al. ..................... 434/59 |

OTHER PUBLICATIONS

White, William J., "A History of the Centrifuge in Aerospace Medicine", Douglas Aircraft Company, Inc., Missile & Space Systems Division Publication GC 482, Apr., 1964, Chapters I through V.

*Primary Examiner*—Edward M. Coven
*Assistant Examiner*—Jessica J. Harrison
*Attorney, Agent, or Firm*—Panitch, Schwarze, Jacobs & Nadel

[57] ABSTRACT

A robust, lightweight g force trainer having low moment of inertia is powered by a relatively low horsepower motor. The trainer has an onset rate of 6 g/sec. or more and idle speed of approximately 13 rpm. The natural frequency of the trainer arm is in excess of 6 hz. The trainer includes a computerized target tracking and missile avoidance system, including a heads up display field at the pilot gondola, and a computerized medical monitor.

39 Claims, 23 Drawing Sheets

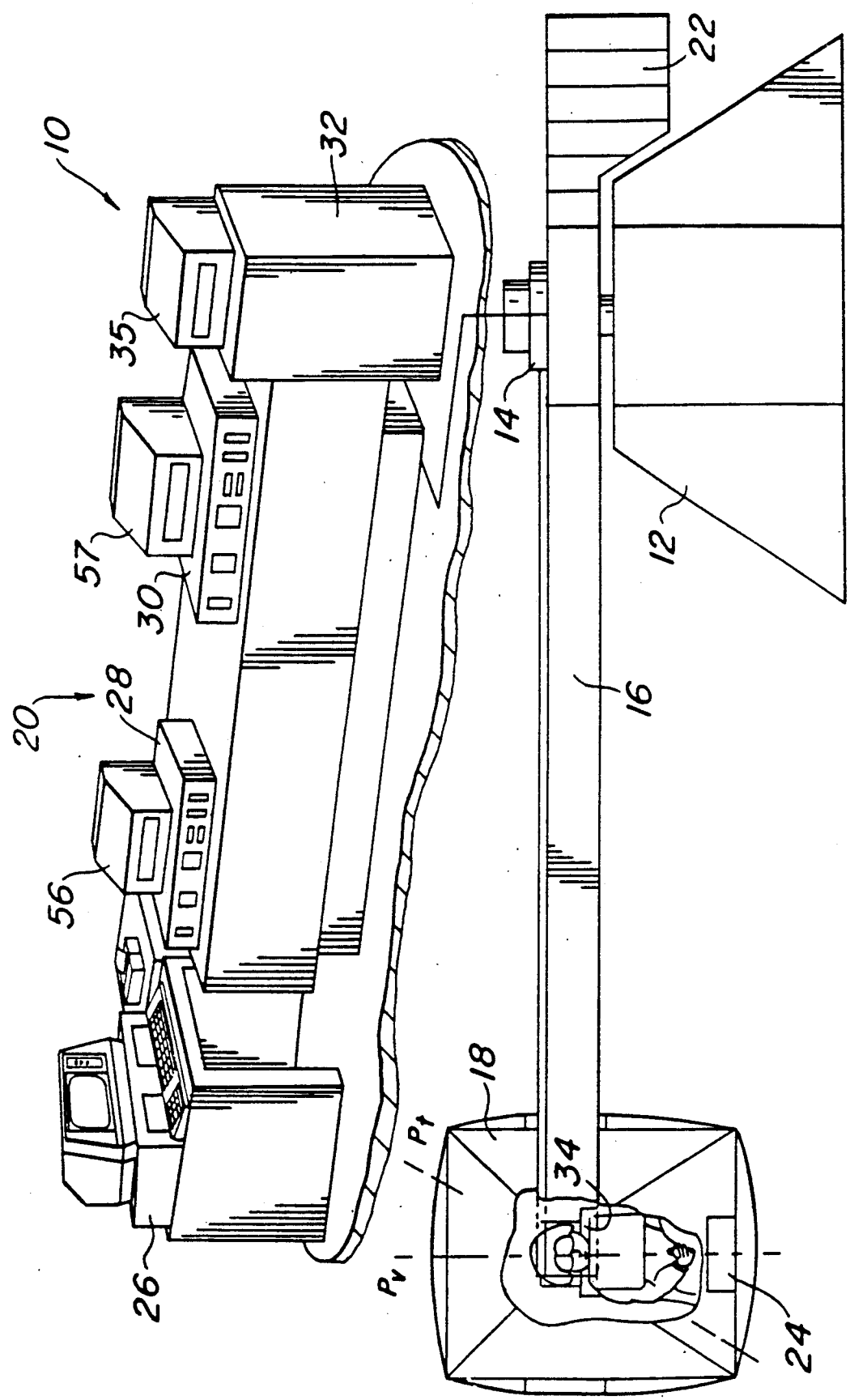

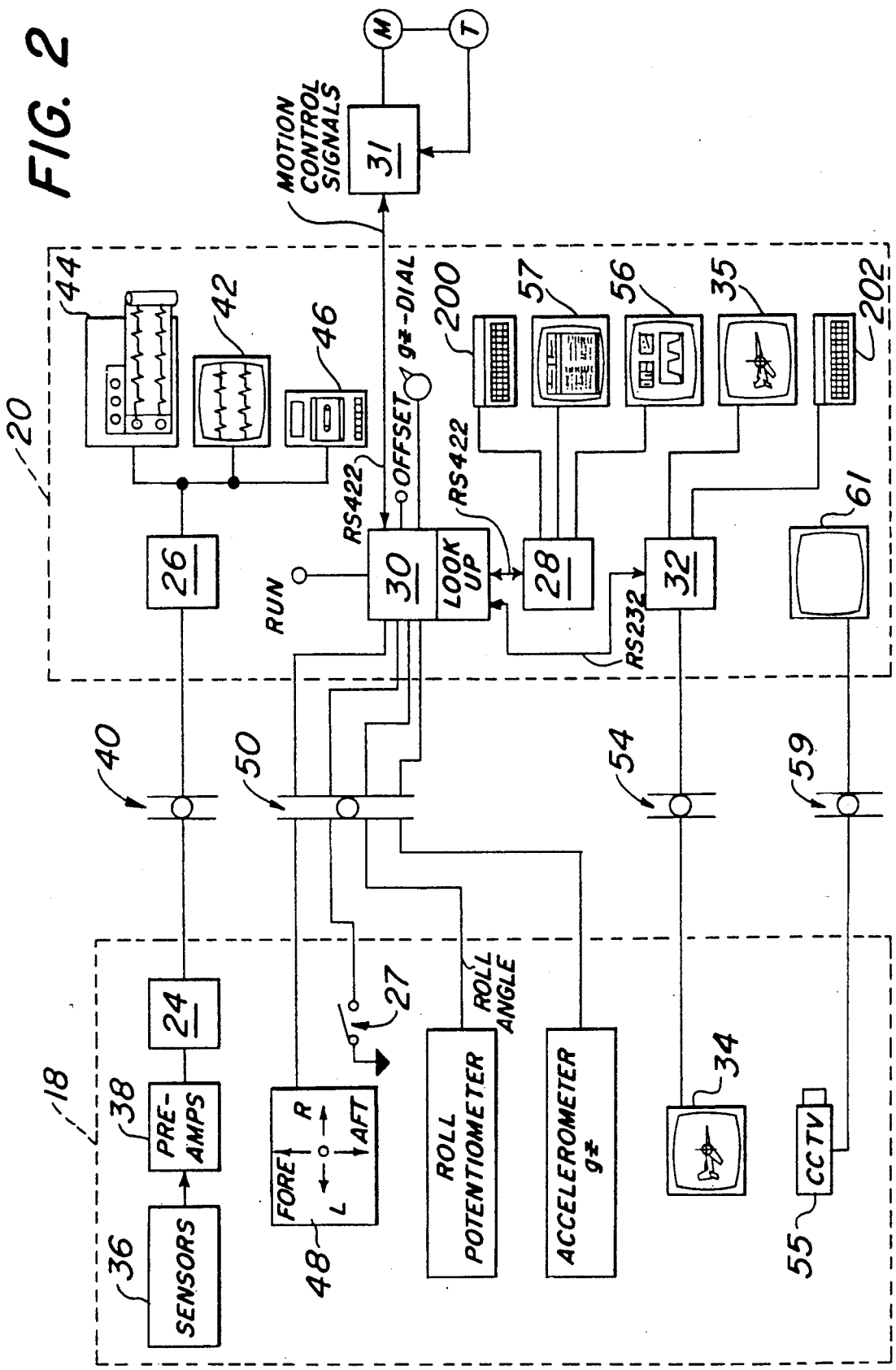

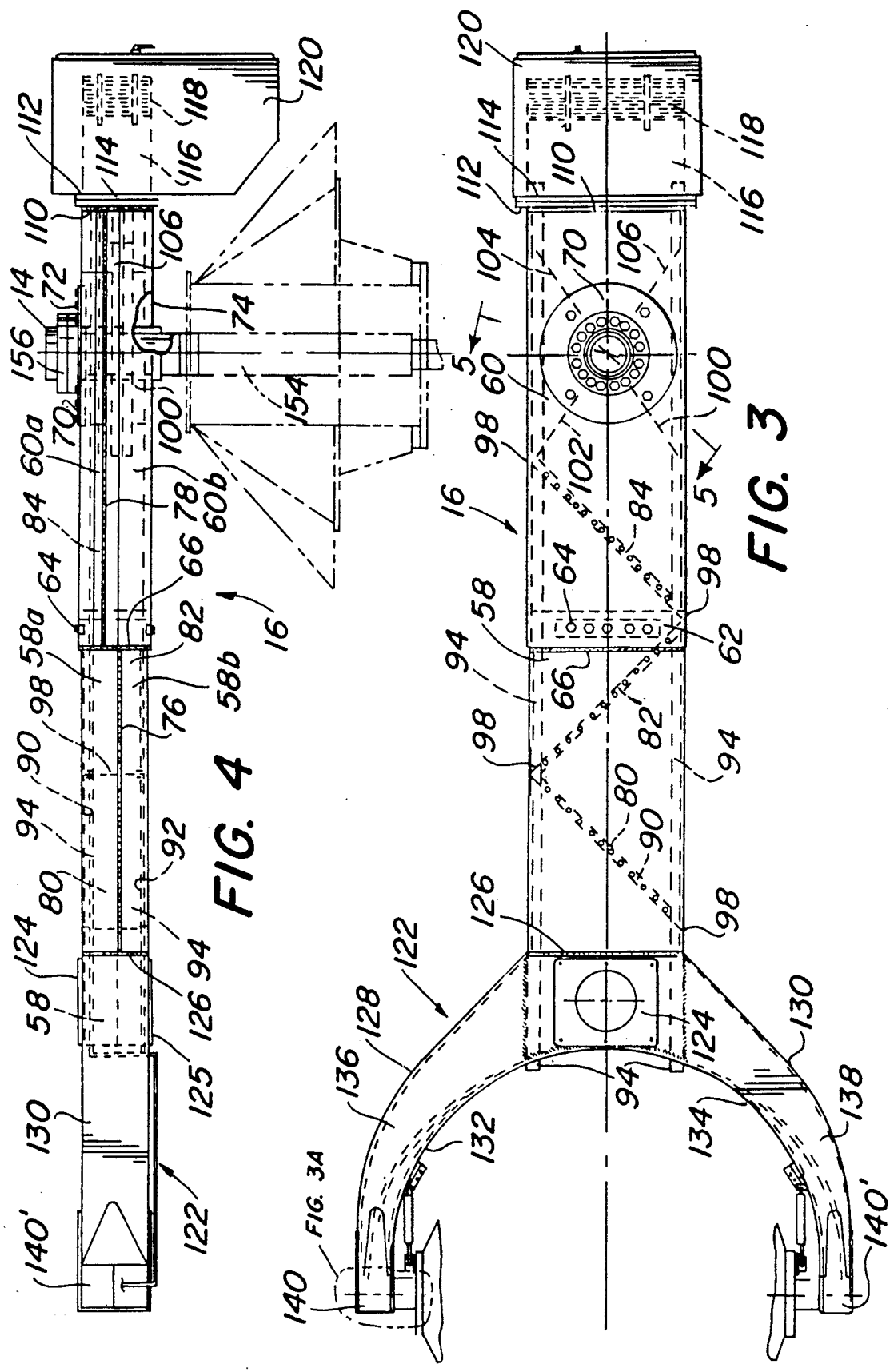

FIG. 14A

| GZ ONSET | | |
|---|---|---|
| STATUS DISPLAY | GZ | TIME 5.7 |

SYSTEM READY

ROOM DOOR             IDLE 1 REACHED
COCKPIT DOOR          IDLE 2 REACHED
ROLL LOCK             SEAT 13 DEG.
GONDOLA ANGLE         SEAT 30 DEG.
HIFLOW VALVE          BELT BUCKLED
NORMAL VALVE          SUIT PRESS. SUPPLY
SEAT Gz POSITION      BREAK SUPPLY PRESS.
SEAT Gy POSITION      ENABLE SWITCH

RUN: STANDBY IDLE RUN MANUAL TRAINEE PROFILE
SWITCH TO STANDBY MODE; CAN BE ONLY DONE, AFTER OR BEFORE RUN.
THIS IS THE RUN MODULE GO THROUGH STANDBY IDLE AND RUN TO RUN.

57

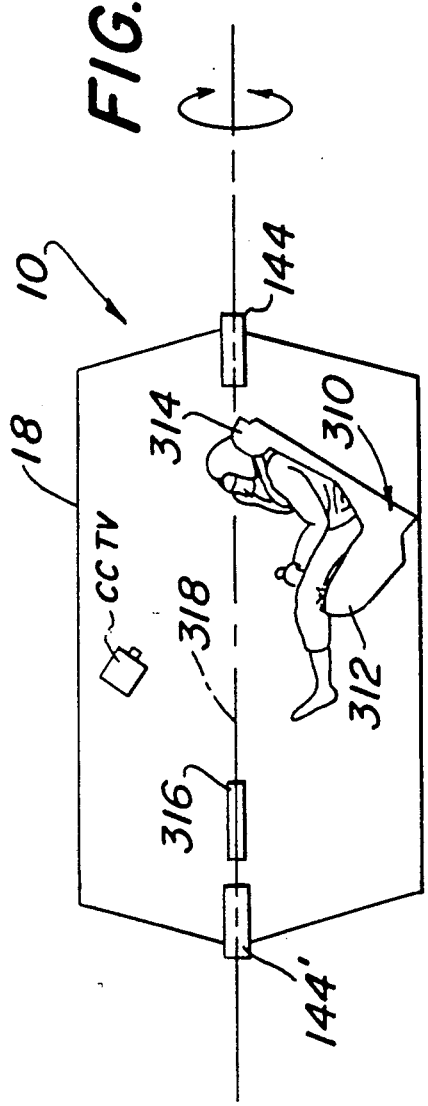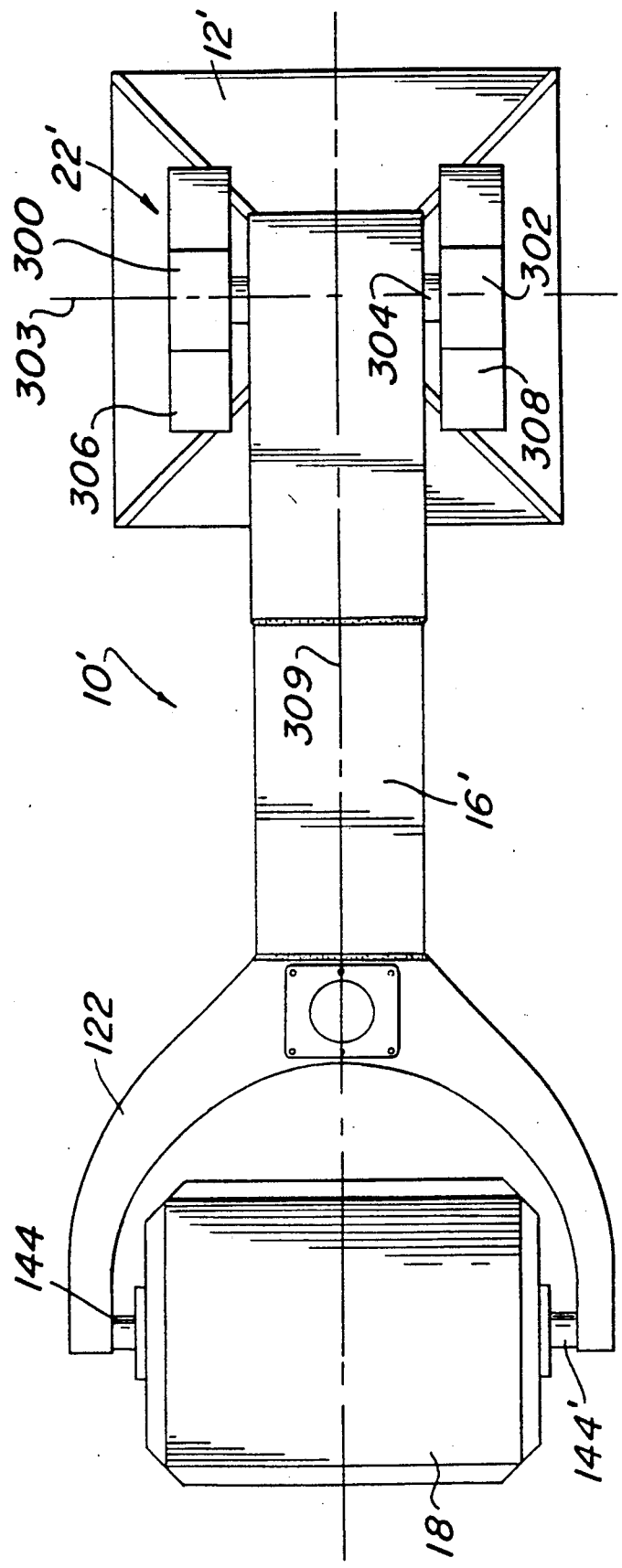

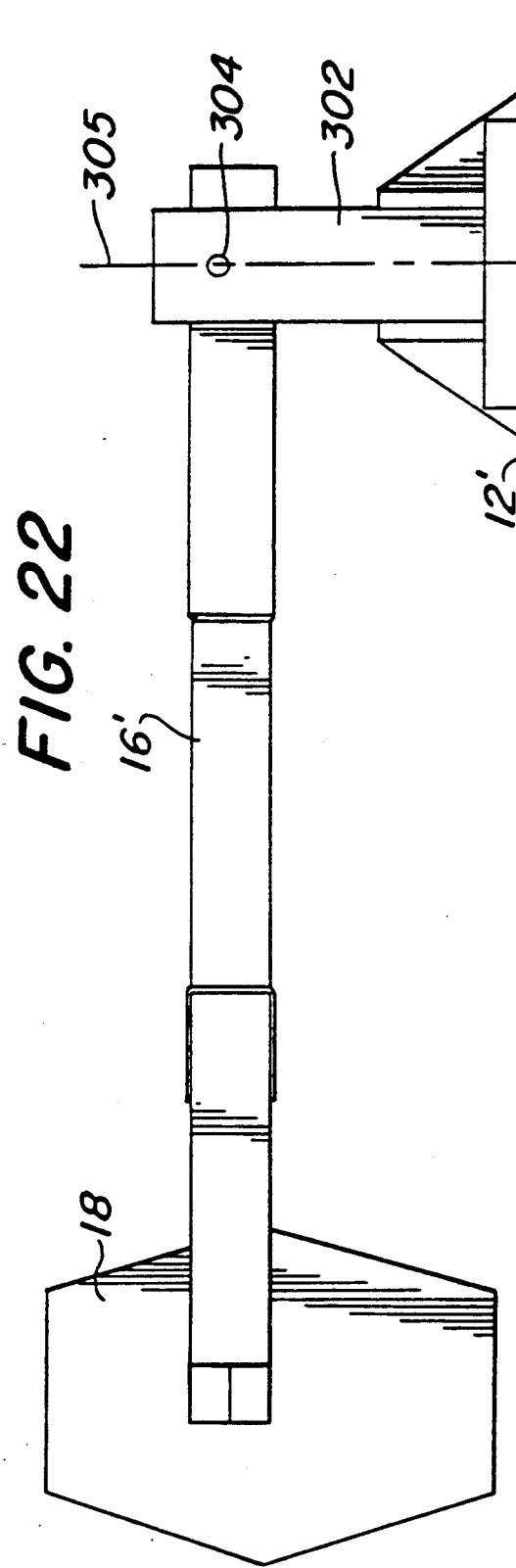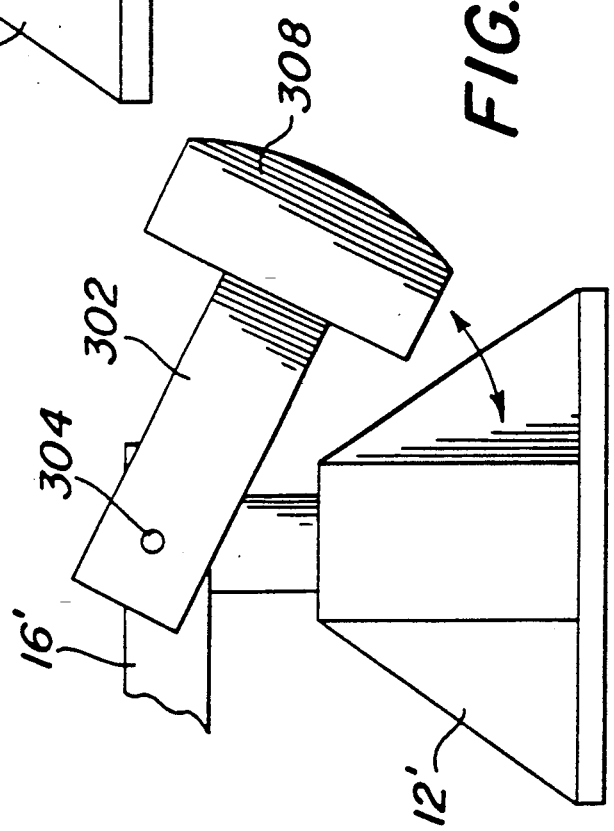

G-FORCE TRAINER

This is a continuation-in-part of co-pending application Ser. No. 108,951 filed on Oct. 14, 1987, now abandoned.

BACKGROUND OF THE INVENTION

The present invention is directed to a g-force trainer or centrifuge wherein a pilot is seated in a gondola mounted on an arm and subjected to g forces approximating those the pilot would encounter in a real aircraft. In today's high speed, highly maneuverable jet aircraft used in the military, a pilot is likely to be subjected to extremely high g forces and onset rates. The pilot must be trained to tolerate "$g_z$" forces from approximately 3 gs to 9 gs and $g_z$ onset rates as high as 6 g/sec or more.

It has been found that the arm for a g-force trainer should have a length of approximately 20 feet or more to minimize inducing pilot disorientation during arm acceleration or deceleration. With this in mind, a g-force trainer having a massive arm approaching 50 feet in length has been proposed. Such a trainer tends to minimize inducing pilot disorientation but, due to excessive arm weight, requires an inordinately large power plant having for example a maximum output of approximately 16,000 HP. A g-force trainer having an arm length of approximately 16 feet has also been proposed to reduce the power demands on the motor. However, due to the arm length, induced pilot disorientation is possible during arm acceleration or deceleration; and a drive motor having a maximum output of approximately 1,000 horsepower is still required.

In designing a g-force trainer, then, one is faced with the problem of designing the arm so that it is long enough to minimize inducing pilot disorientation during arm acceleration or deceleration yet sufficiently lightweight to enable the use of a drive motor having relatively low horsepower output. Present approaches to the design of g-force trainers known to us have been unable to minimize inducing pilot disorientation while at the same time reducing power demands so that relatively small motors, e.g., motors having less than 1,000 hp maximum output, can be utilized to drive the arm.

Regardless of its weight, the arm must also be relatively stiff so as to minimize deflection under loading by the gondola and pilot. Also, the natural frequency of the arm should be in excess of approximately 3-6 hz, i.e., the natural frequency of the human body. For loss of consciousness (loc) training, the arm should be sufficiently lightweight so as to achieve the accelerations and decelerations required to subject the pilot to $g_z$ forces from approximately 3 gs to 9 gs. Since the human heart is able to pump blood at a force of approximately 4.2 gs, $g_z$ forces of approximately 4.2 gs or more will overcome the pumping ability of the heart and result in loss of consciousness.

To be truly effective, a g force trainer should not only be capable of subjecting the pilot to the foregoing range of $g_z$ forces and onset rates but should also permit the pilot to "execute" maneuvers which are expected to result in those forces and onset rates. Thus, a pilot is likely to encounter specific $g_z$ forces and onset rates when tracking a target aircraft practicing an evasive maneuver or when himself practicing an evasive maneuver to avoid a missile locked on the pilot's aircraft. Merely subjecting the pilot to a range of $g_z$ forces and onset rates without permitting the pilot to participate by "tracking" a target or "evading" a missile does not produce realistic $g_z$ force tolerance training.

During $g_z$ force training, moreover, it is desirable to visually monitor the pilot and to measure certain physiologic responses of the pilot such as heart rate, noninvasive blood pressure, skin temperature electrocardiogram, electromyogram, electroencephalogram and temporal pulse rate. The pilot's appearance and the electrocardiogram, electromyogram and electroencephalogram and temporal pulse measurements in particular should be displayed in real time for research purposes so that the pilot's condition can be monitored instantaneously during training. Any adverse or dangerous conditions should be noted immediately so that the trainer can be stopped if warranted.

Due to conventional wiring requirements, which result in low signal to noise ratios, the accuracy with which such physiologic measurements are recorded and displayed may be unacceptable. There is a need to minimize electrical noise whatever wire lengths are employed to ensure that such measurements are accurately recorded and displayed.

For military pilots, there are certain accepted $g_z$ force profiles, that is, patterns of $g_z$ force variations which represent the $g_z$ forces and onset rates to which a pilot would normally be subjected. A g force trainer should be able to reproduce such $g_z$ force patterns accurately from test to test without intervention of an operator.

Normally, in g-force trainers of the type herein the pilot is seated such that the gondola roll axis intersects the pilot's body at the elevation of the heart. As a result, as the gondola accelerates around the roll axis the pilot's head is subjected to angular rotation and centrifugal force. Applicants have recognized that this produces pilot disorientation and that this disorientation can be substantially reduced.

G-force trainers or centrifuges known to applicants utilize fixed arm counterweights to dynamically balance the arm especially at higher speeds. These counterweights are fixed to the arm such that the counterweight center of gravity is fixed relative to the trainer axis of rotation. As a result, they pose significant inertial loads, i.e., (torque) demands, on the drive motor at start-up for high onset rates. It would be desirable to preserve dynamic balance, especially at higher arm speeds, while reducing the power (torque) demands on the drive motor at start-up.

Finally, a g-force trainer should include a mechanism for protecting the pilot from injury, and the trainer components from structural damage, due to stresses arising from erratic arm motion including abrupt starts and/or stops. Arm motion of this type might result form failure or malfunction of the arm speed control.

The present invention solves all of the foregoing problems by providing an extremely lightweight yet stiff arm having a length of approximately 20 feet, a break-away shear pin which couples the arm and driven shaft, and a gondola roll axis aligned with the pilot's head at eye level thereby providing: substantially reduce pilot disorientation during acceleration or deceleration, a natural frequency in excess of 6 hz, arm deflection in the order of ¼ inch, and an arm which can freewheel to protect the pilot from injury and the arm, yoke and gondola from structural damage. The trainer may be driven by a motor having reduced maximum horsepower output. The pilot may "execute" target tracking or missile avoidance maneuvers which affect arm motion so as to produce $g_z$ forces and onset rates representative of those which would actually be encountered by the pilot during such maneuvers. The pilot's appearance is monitored by a CCTV camera at the gondola. A computerized medical monitoring system is provided wherein physiologic data is transmitted and received with improved signal to noise ratio for accurate recordal and display.

BRIEF SUMMARY OF THE INVENTION

A g force trainer comprising a shaft driven by a motor in response to motion control signals, a tubular arm secured to the shaft for rotation therewith about the shaft axis, a yoke secured to the arm, and a gondola mounted at the yoke so as to roll about a horizontal axis in proportion to the speed of rotation of the arm about the shaft axis. A preferred weight distribution of the trainer along the longitudinal axis of the arm is substantially as shown in FIG. 6. A preferred inertial distribution is substantially as shown in FIG. 7.

The g force trainer includes a first visual display, having a heads up display field and a target display field, and a pilot operable joy stick, both of which are located inside the gondola. Motion control computer means operable in a pilot mode produces motion control signals in real time based on joy stick operation whereby the pilot is "in the loop", i.e., subjected to $g_z$ forces and onset (or offset) rates correlated to joystick operation.

In the pilot mode, graphics computer means operates the first visual display so as to display terrain and flight data, such as aircraft attitude, altitude, rate of climb, air speed, heading and $g_z$ force, on the heads up display field and so as to display a target image and an index image (cross hairs) on the target display field. The relative position of the target image and index image on the target display field varies based on pre-programmed (stored) data, including target $g_z$ force, and on joystick operation. The graphics computer means also operates the first visual display in the pilot mode so as to display on the target display field an indication representing the location of a missile relative to pilot aircraft position based on pre-programmed (stored) data.

The g force trainer includes a second visual display at a remote location with respect to the gondola. Display computer means operates the second visual display in the pilot mode so as to display thereon a fixed line image representing a predetermined pattern of $g_z$ forces for the target as a function of time, based on the preprogrammed (stored) data, and an advancing line image representing actual $g_z$ force at the gondola in real time based on sensed $g_z$.

The motion control computer means is also operable in a profile mode to produce the motion control signals based on pre-programmed (stored) data including desired $g_z$ force at the gondola whereby the pilot is "out of the loop", i.e., subjected to predetermined $g_z$ forces and onset (or offset) rates. In the profile mode, the display computer means operates the second visual display so as to display thereon the fixed line image representing the predetermined pattern of desired $g_z$ force at the gondola as a function of time, based on the pre-programmed (stored) data, and an advancing line image representing actual $g_z$ force at the gondola in real time based on sensed $g_z$.

The motion control computer means is also operable in a manual mode to produce the motion control signals based on manual operation of a remote $g_z$-dial control by remote station personnel whereby the pilot is "out of the loop", i.e., subjected to $g_z$ forces and onset (or offset) rates selected in real time by the remote station personnel. In the manual mode, the display computer means operates the second visual display so as to display thereon the advancing line image representing actual $g_z$ force at the gondola in real time based on sensed $g_z$.

BRIEF DESCRIPTION OF THE DRAWINGS

FIG. 1 is a diagrammatic representation of the g force trainer of the present invention.

FIG. 2 is a block diagram of the electronics for the g force trainer.

FIG. 3 is a top plan of the gondola arm.

FIG. 4 is a side elevation of the gondola arm.

FIGS. 14A and 14B show the visual displays at another remote console, one being a status display and the other being the advancing line image of $g_z$ force.

FIG. 21 is a diagrammatic representation (taken in top plan) of the g-force trainer of the present invention with a swingable counterweight.

FIG. 22 is a diagrammatic representation (taken in elevation) of the g-force trainer of FIG. 21 with the counterweight in the rest position.

FIG. 23 is a diagrammatic representation (taken in elevation) of a portion of the g-force trainer of FIG. 21 with the counterweight in an extended position.

FIG. 24 is a diagrammatic representation of a portion of the gondola interior showing the pilot's chair aligned with the gondola roll axis so as to reduce disorientation.

DETAILED DESCRIPTION OF THE INVENTION

Figure 3A:
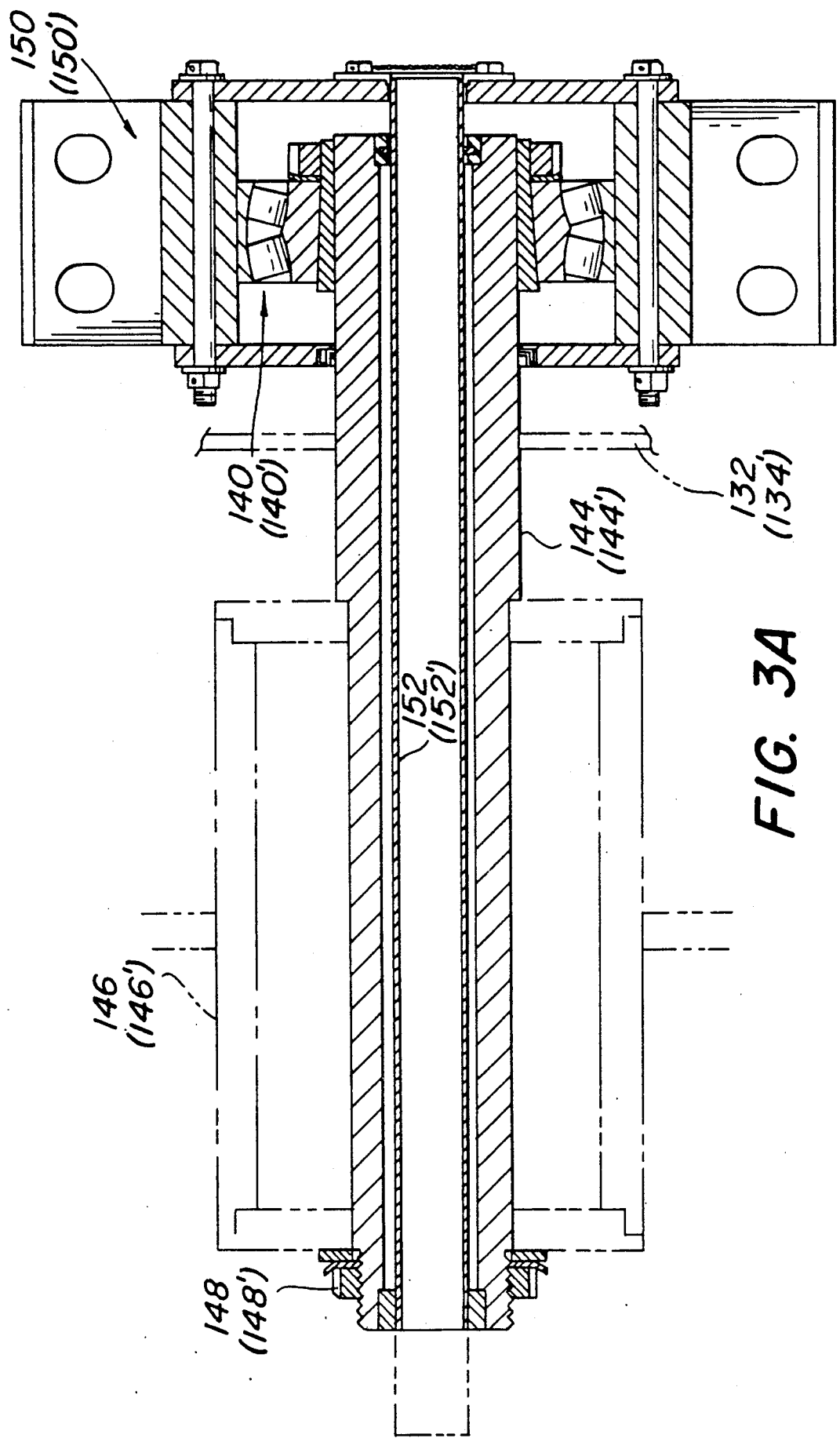
FIG. 3A is an enlarged section of a shaft bearing connecting the gondola to the gondola arm yoke.

Referring to the drawings, wherein like numerals indicate like elements, there is shown in FIG. 1 a diagrammatic representation of the g force trainer of the present invention designated generally as 10. The trainer includes a drive shaft pedestal assembly 12, a hub 14, arm 16, gondola 18 and remote station 20. The pilot is seated in the gondola. A counterweight 22 is mounted in an enclosure and bolted to the end of the arm 16 adjacent hub 14 to keep the rotating system balanced under dynamic load.

Personnel at remote station 20 select various modes of operation for the trainer, e.g., pilot, profile or manual, control the operation of the trainer and monitor the pilot's condition as more fully described hereafter. A computer processor 24 is mounted in the gondola. See FIG. 2. The computer processor 24 processes physiologic data signals and transmits the signals to medical monitoring computer 26 at the remote station so as to enhance signal to noise ratio and reduce wiring requirements as described hereafter. Medical monitoring computer 26 receives and processes the physiologic data transmitted by computer processor 24 for storage and display. A motion control computer 30 at the remote station generates motion control signals which command an electronic motor drive controller 31. The motor drive controller 31 controls the speed of a motor (designated "M" in FIG. 2) which determines the speed of arm 16. Motor M is connected to the controller via a tachometer feedback loop.

The motion control computer 30 communicates with a display control computer 28, at the remote station, which operates screens 56 and 57 so as to display thereon data representative of actual $g_z$ force at the gondola 18. Screens 56 and 57 are monitored by appropriate personnel at the remote station. The motion control computer 30 also communicates with a graphics computer 32 at the remote station which operates a screen 34, located in gondola 18, so as to display thereon terrain, light conditions, flight data, $g_z$ force, and target or missile location. In like manner, graphics computer 32 also operates a screen 35 located at the remote station and monitored by the remote station personnel.

Figure 10:
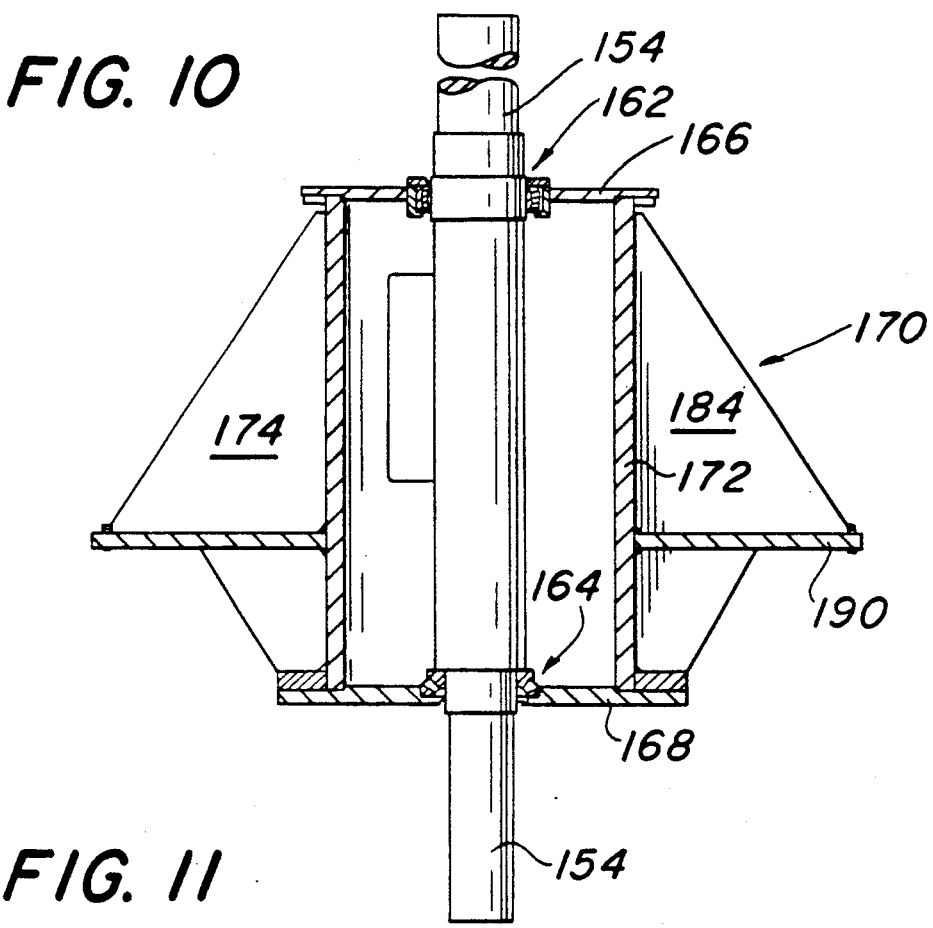
FIG. 10 is a vertical section of the pedestal and drive shaft.
Figure 11:
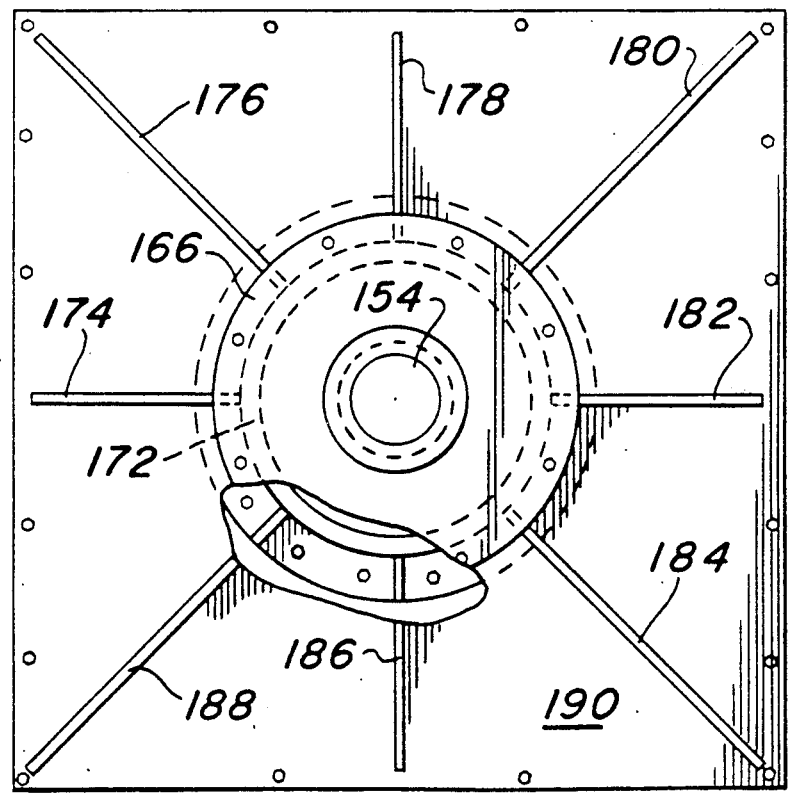
FIG. 11 is a top plan of the pedestal and drive shaft.

A group of sensors 36 are located in the gondola 18 for attachment to the pilot. The sensors include a heart rate sensor, non-invasive blood pressure sensor, skin temperature sensor, peripheral pulse sensor, and EKG, EMG and EEG sensors. The outputs of the sensors are analog signals which are amplified by pre-amplifiers 38 and fed to computer processor 24. The computer processor 24 processes the sensor outputs and transmits them, via slip rings 40 mounted on a driven shaft 154 (described more fully hereafter in connection with FIGS. 10 and 11) to medical monitoring computer 26. By digitizing certain of the analog sensor output signals at computer processor 24, fewer signal lines are required to transmit the sensor output data to the slip rings. By reducing the analog signal path, which is primarily responsible for degradation of signal to noise, signal to noise is enhanced. The processed sensor signals are received by the medical monitoring computer 26 which sorts and processes the signals and operates a screen 42 at the remote station so as to display thereon in real time heart rate, blood pressure, skin temperature, peripheral pulse rate, EKG, EMG and EEG waveforms. The computer 26 also operates a strip chart recorder 44, so as to provide a printed record of each of the aforementioned physiologic characteristics of the pilot, and a tape recorder 46 so as to store on magnetic tape data representative of the physiologic characteristics.

Figure 28:
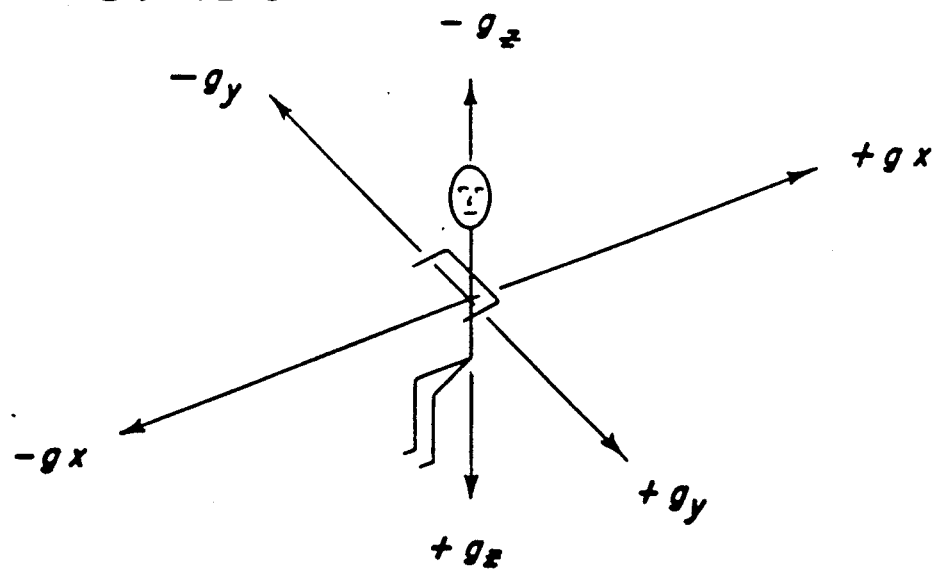
FIG. 28 is a vector diagram showing the directions of gx, gy and $g_z$ forces.

The gondola 18 is provided with a conventional pilot operable joystick unit 48 including a joystick which is displaceable in the left, right, fore and aft directions. The joystick unit includes an analog signal generator which produces an analog signal representative of desired $g_z$ force, hence speed of arm 16, based on joystick fore or aft displacement. (Gz is synonymous with "+$g_z$" according to conventional aeromedical definition of a 3-axis coordinate system for analyzing the effect of acceleration or inertial forces on man as shown in FIG. 28.) The magnitude of the signal represents desired $g_z$ force at the gondola, and its slope represents onset (or offset) rate. By onset (or offset) rate is meant increasing (or decreasing) time rate of change of $g_z$ force. In the g-force trainer herein, $g_z$ force at the gondola is determined by arm speed. The speed of the aircraft (not the arm) is presumed constant, the aircraft is presumed to be in a left hand turn as shown in FIG. 1, and the joystick unit analog signal represents a desired aircraft turn.

The analog signal generated by the joystick unit is fed through slip rings 50 (also mounted on driven shaft 154) to the motion control computer 30. Motion control computer 30 accesses a look up table in memory based on the analog signal. The look up table contains values of desired $g_z$ force (at the gondola), gondola roll angle and motor speed and arm speed. Thus, for each value of $g_z$ force, there is a corresponding value for the gondola roll angle and a corresponding value for the motor speed and a corresponding value for the arm speed. Based on the value of $g_z$ force indicated by the analog output of the joystick unit, the motion control computer 30 retrieves a desired motor speed value from the look up table and generates a motion control signal based on the retrieved value. The motion control signal represents desired motor speed, hence arm speed; and it commands the motor drive controller 31. Controller 31 controls drive motor M which drives shaft 154 and is the prime mover for arm 16. Thus, joystick motion in the fore or aft direction produces motion control signals which cause the motor M to rotate shaft 154, hence arm 16, at decreasing (or increasing) speeds to create the desired $g_z$ force and onset (or offset) rate. In the preferred embodiment herein, joystick motion in the left or right direction has no effect on the motion control signals produced by control computer 30.

The joystick is also provided with a pilot operable trigger switch 27 which is the type of switch operated by a pilot to "fire" a missile. The switch is connected to motion control computer 32 via slip rings 50. Its operation is described hereafter in connection with system operation in the pilot mode.

A roll angle sensor is also located at the gondola. The sensor has a potentiometer output indicative of actual tilt or roll angle of the gondola with respect to vertical. The output of the potentiometer is connected via slip rings 50 to the motion control computer 30 and is only used as a safety check as described hereafter.

The gondola is also provided with a 3-axis accelerometer which generates an output indicative of acceleration along the gx, gy and $g_z$ axes. The $g_z$ output is indicative of instantaneous $g_z$ force and is used both as a safety check and for deriving an advancing line image of actual $g_z$ force at the gondola for visual display at the remote station.

Tachometer (T) senses motor speed and generates an output indicative thereof. The tachometer output is fed to motion control computer 30 wherein it is scaled and digitized and used a safety check as described hereafter.

A CCTV camera 55 is located in the gondola 18 to monitor the pilot's appearance. The camera is connected via slip rings 59 (mounted on driven shaft 154) to a monitor 61 at remote station 20.

Motion control computer 30 is connected by an RS232 communications link to graphics computer 32. Graphics computer 32 is connected via slip rings 54 to screen 34 in gondola 18. Computer 32 is programmed to produce digitized signals which operate screen 34 so as to display terrain and flight data, as well as a target image and cross hairs for use by the pilot in target tracking and missile avoidance in the pilot mode. In target tracking, the target image represents an evasive target having a location on screen 34 which varies according to fore-aft operation of the joystick and pre-programmed (stored) target data stored in memory in computer 32. The pre-programmed (stored) target data represents a specific pattern of movement of the target in real space which, if tracked by the pilot, would produce a predetermined sequence of $g_z$ forces and onset (or offset) rates at the gondola. The cross hairs are preferably fixed in position on screen 34.

The motion control computer 30 is also connected to the output of a $g_z$-dial control located at the remote station. The $g_z$-dial control is used by remote station personnel to command the motor M in the manual mode via motion control computer 30 and controller 31. The $g_z$-dial control is provided with a potentiometer output which represents desired $g_z$ force at the gondola. In the manual mode, the motion control computer retrieves a desired motor speed value from the look up table based on the $g_z$-dial potentiometer output, and it generates the motion control signal based on the retrieved value.

In a profile mode, described in further detail hereafter, the motion control computer retrieves a desired motor speed value from the look up table based on a retrieved value of desired $g_z$ force stored in memory in the computer. The retrieved value of desired $g_z$ force is part of a selected $g_z$ profile pre-programmed or stored in the memory. The profile includes a sequence of values of time, desired $g_z$ force, and onset (or offset) rate. Thus, for each value of time there is a corresponding value of desired $g_z$ force and onset (or offset) rate. The motion control computer generates the motion control signal based on the value of desired motor speed retrieved from the look up table.

The motion control computer 30 is also connected by an RS422 link to display control computer 28. Display control computer 28 operates screens 56 and 57 so as to display an advancing line image representing actual $g_z$ force at gondola 18 in real time according to the sensed $g_z$ output of the gondola accelerometer. Thus, the computer 28 receives $g_z$ values from the accelerometer output via computer 30 and the RS422 link and displays the values in the form of an advancing line image on screens 56 and 57.

Further details of the assembly and operation of the g-force trainer are set forth below with particular reference to the mechanical assembly and the pilot, profile and manual modes of operation.

MECHANICAL ASSEMBLY

Referring to FIG. 3, arm 16 is a unified body which comprises a pair of telescoped thin-walled tubular sections 58, 60 each having a generally rectangular cross section. The walls of section 58 are preferably 0.09 inch thick and are made of #301 stainless steel. The walls of section 60 are preferably 0.125 inch thick and are also made of #301 stainless steel. Section 58 is telescoped slightly within section 60 as at 62, and the walls of sections 58, 60 are secured together by a filler weld extending around the entire periphery of the arm sections at 66. Bolts 64 are provided to fortify the weld. By constructing the gondola arm 16 of thin-walled #301 stainless steel, the arm possesses a high yield stress such as 60,000 psi but is extremely lightweight thereby resulting in a low inertial distribution along the arm which is extremely important in reducing power requirements for the motor M.

Figure 5:
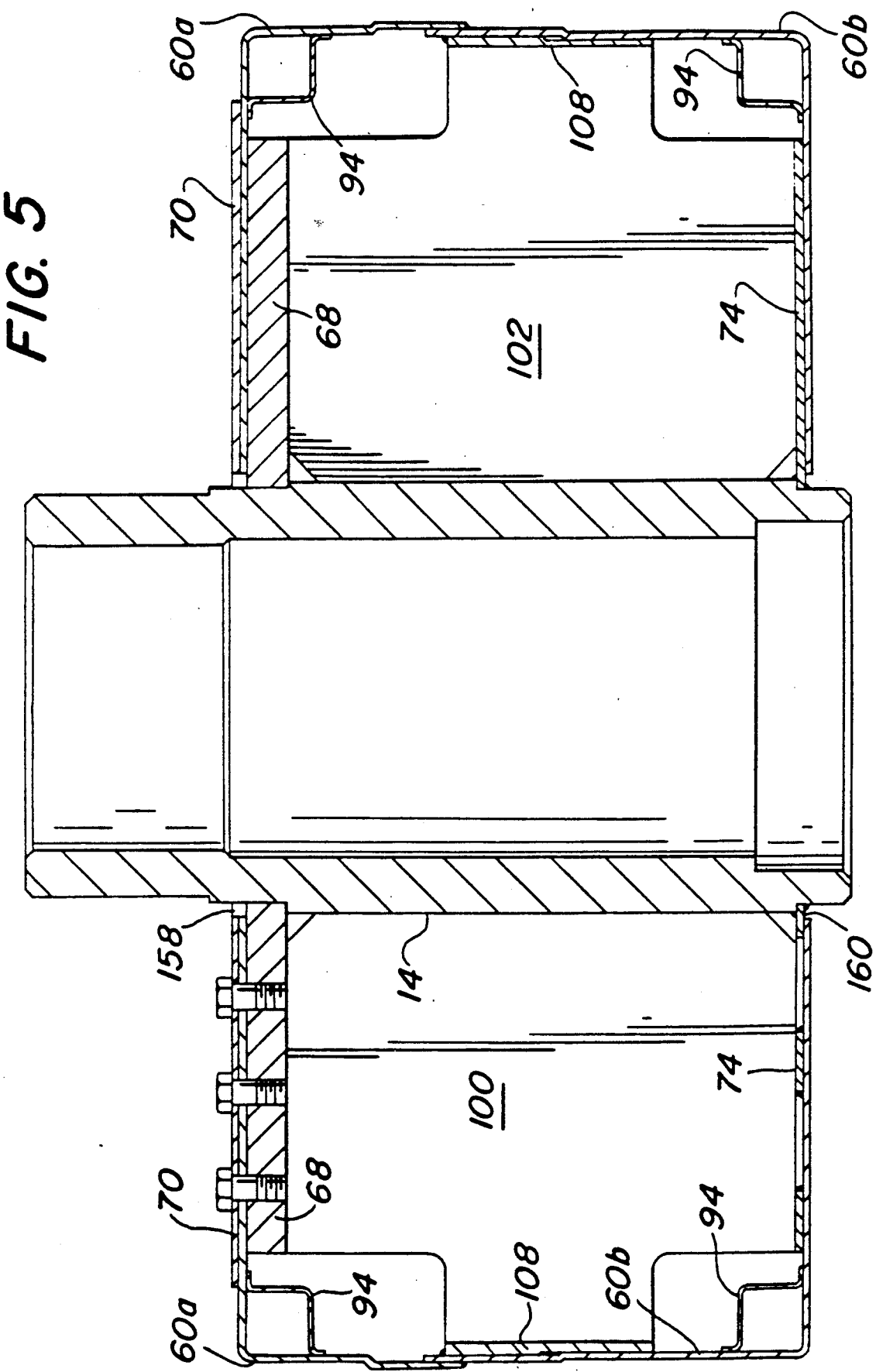
FIG. 5 is a section taken along 5—5 in FIG. 3.

A 1.25 inch thick reinforcement disk 68 of rigid material is secured to the top wall of arm section 60 and is securely mounted on hub 14 as shown in FIGS. 3-5. A 0.25 inch thick reinforcement disk 70 of rigid material is secured to the exterior surface of the top wall of arm section 60. Disks 68, 70 are secured to the top wall of section 60 by bolts 72. A 0.25 inch thick reinforcement disk 74 of rigid material is secured to the hub 14 and the interior surface of the bottom wall of section 60.

Preferably, each arm section 58, 60 is a unified body which comprises a pair of channel shaped members seam welded together along their entire lengths. Arm section 58 comprises channel shaped members 58a, 58b, the side walls of member 58b extending interiorly of the side walls of member 58a so as to create a slight overlap. The channel shaped members 58a, 58b are seam welded as at 76 along the region of side wall overlap. Similarly, arm section 60 comprises channel shaped members 60a, 60b, and the side walls of channel shaped member 60b extend interiorly of the side walls of channel shaped member 60a so as to create a slight overlap, the side walls being seam welded together as at 78 at their region of overlap.

Thus, the gondola arm 16 comprises telescoping sections 58, 60, each section being defined by a pair of channel shaped members 58a, 58b and 60a, 60b, all sections being welded together and bolted as previously described to provide a lightweight but relatively rigid and strong, unified body. The arm is also stiffened by a series of gusset plates 80, 82, 84 which are secured to arm sections 58, 60 and arranged in a zig-zag pattern inside the gondola arm. All gusset plates are identical so that description of gusset plate 80 will suffice.

Gusset plate 80 is a generally rectangular shaped 0.09 inch thick piece of rigid material cut away at its corners to provide clearance for L-shaped brackets 94. There are four such L-shaped brackets, each extending over the length of the gondola arm 16 at the arm corners. Each L-shaped bracket is secured to adjoining walls of an arm section (58, 60), i.e., at an interior corner of each arm section, to provide a wiring conduit for electrical wiring extending between the gondola 18, and the shaft mounted slip rings (e.g. 40, 50, 54, 59). The lower flange 92 of gusset plate 80 is welded to the bottom wall of channel shaped member 58b. The upper channel member 58a is provided with a series of small openings 96 aligned with the upper flange 90 of the gusset plate, and the upper flange of the gusset plate is plug welded to the top wall of channel shaped member 58a at the openings 96. Adjoining gusset plates are also welded to each other and to the side walls of channel shaped members 58a, 58b at junctions 98 (FIG. 3).

Additional gusset plates 100, 102, 104, 106 are provided at the end of arm 16 proximal hub 14. Gusset plates 100, 102, 104, 106 extend radially of hub 14 between the hub and the side walls of channel shaped members 60a, 60b. Gusset plates 100, 102, 104, 106 are welded to the hub 14. Each gusset plate is cut away at the plate corners proximal the side walls of channel shaped members 60a, 60b to provide clearance for the L-shaped brackets 94. Each gusset plate is provided with a side flange 108 (FIG. 5) which is welded to a side wall of channel shaped member 60b.

The end edges of the side walls and top and bottom walls of channel shaped members 60a, 60b proximal hub 14 are welded along their entire peripheries at 110 to a rectangular flange plate 112. See FIG. 3. Flange plate 112 is bolted to a like flange plate 114 which is welded to a counterweight 116 weighing approximately 6,500 pounds. One or more counterweight plates 118 may be bolted to counterweight 116 so as to adjust the total counterweight for the arm. Preferably, the counterweight is a solid steel mass which is generally rectangular in section and is cut away at the corner edges to provide clearance for the L-shaped brackets 94 which extend through openings in the flange plates 112, 114 into enclosure 120.

Arm section 58 is telescoped within a generally U-shaped yoke 122 on which gondola 18 is mounted. The top wall of arm section 58 is welded and then bolted to the top wall of yoke 122 and to a reinforcement plate 124. The bottom wall of arm section 58 is welded and then bolted to the bottom wall of yoke 122 and to a reinforcement plate 125. The yoke 122 has a central, generally rectangular passage into which arm section 58 telescopes or extends, and the yoke is welded to arm section 58 as at 126 along the entire periphery of the passage opening.

The yoke 122 itself is a unified body having top and bottom walls, curved outer walls 128, 130 which flank the passage opening through which arm section 58 extends, and curved inner walls 132, 134 which flank the end edges of the side walls of arm section 58. See FIGS. 3 and 4. The top and bottom walls of yoke 122 and the curved walls 128, 130, 132, 134 of the yoke are welded together to define yoke arms 136, 138. Shaft bearings 140, 140' are mounted in the ends of yoke arms 136, 138 respectively.

Referring to FIG. 3A, there is shown an enlarged section of shaft bearing 140 mounted on the end of yoke arm 136. In the drawings and following description of bearing 140, primed numerals indicate like elements of shaft bearing 140'. A hollow shaft 144 (144') extends through a cylindrical hub 146 (146') secured to the gondola frame. The gondola frame is a lightweight material, preferably aluminum. A nut 148 (148') is threaded on an end of the shaft 144, (144') to secure the shaft to the hub 146 (146'). The opposite end of the shaft 144 (144') extends through the yoke inner curved wall 132 (134) and is journaled in bearing 140 (140') inside a pillow block housing 150 (150') which is securely mounted within yoke arm 136 (138). A cylindrical wire conduit tube 152 (152') extends through the hollow interior of shaft 144 (144') and is secured at one end to the pillow block housing. Preferably, bearings 140, 140' are fixed bearings secured by retaining disks or the like to pillow block housings 150, 150'.

Referring to FIG. 4, the hub 14, with arm 16 secured thereto, is mounted on the top end of driven shaft 154. Preferably, the hub is secured to the driven shaft 154 by means of a Ringfeder shrink disk 156. The driven shaft 154 is preferably made of steel and is a solid cylinder six feet long having a 10 inch diameter and a weight of approximately 3,000 pounds. The hub 14 itself has a maximum O.D. of 14 inches and is approximately two feet in length. Referring to FIG. 5, the hub 14 extends through a circular opening 158 in the top wall of channel shaped member 60a and an identical opening 160 in the bottom wall of channel shaped member 60b. The driven shaft 154 is journaled in bearings 162, 164 at the top and bottom walls 166, 168 of pedestal assembly 170. See FIG. 10. The pedestal assembly 170 includes a cylindrical housing 172 and upright support plates 174, 176, 178, 180, 182, 184, 186, 188 secured thereto and to a stabilizer plate 190 which is bolted to the ground support surface. See FIG. 11. The cylindrical housing 172 and the driven shaft 154 extend below ground level into a pit 192. See FIG. 8. Shaft 154 is driven by a 400 hp motor M through right angle gearing 194, the motor M and the right angle gearing 194 being located in the pit.

Figure 8:
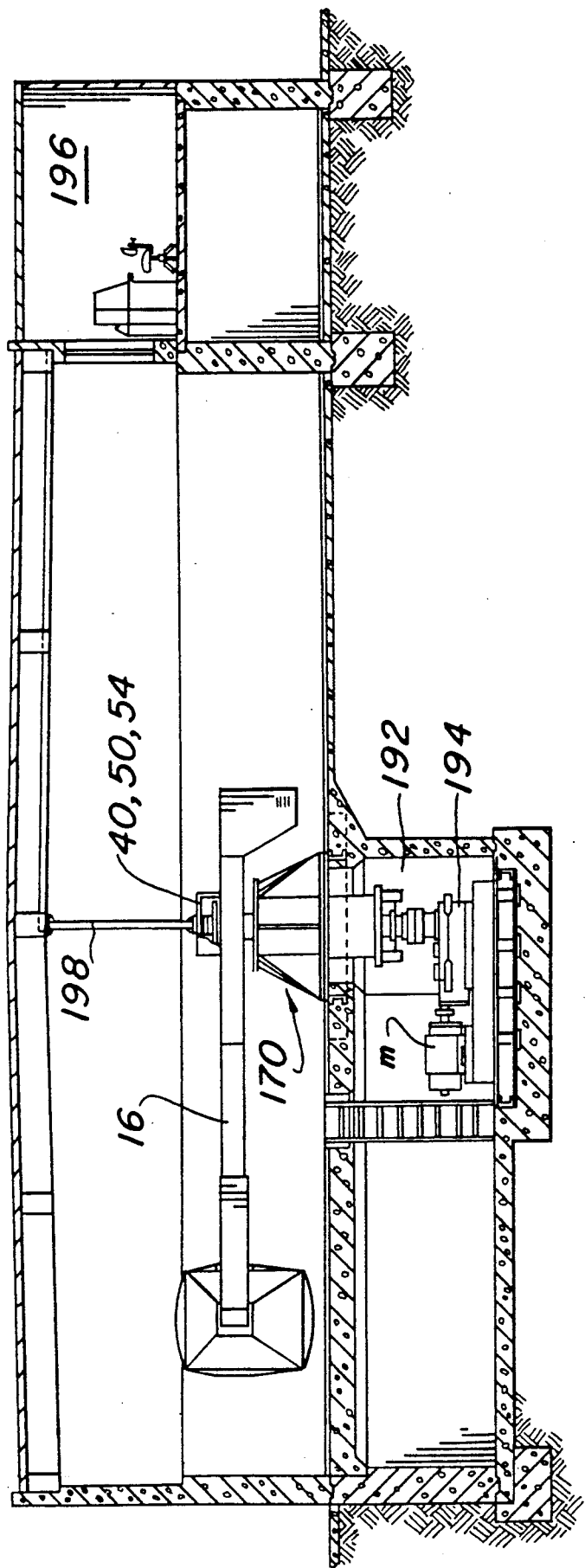
FIG. 8 is a detail of the g force trainer showing the installation for the motor drive and relative location of the remote station.
Figure 9:
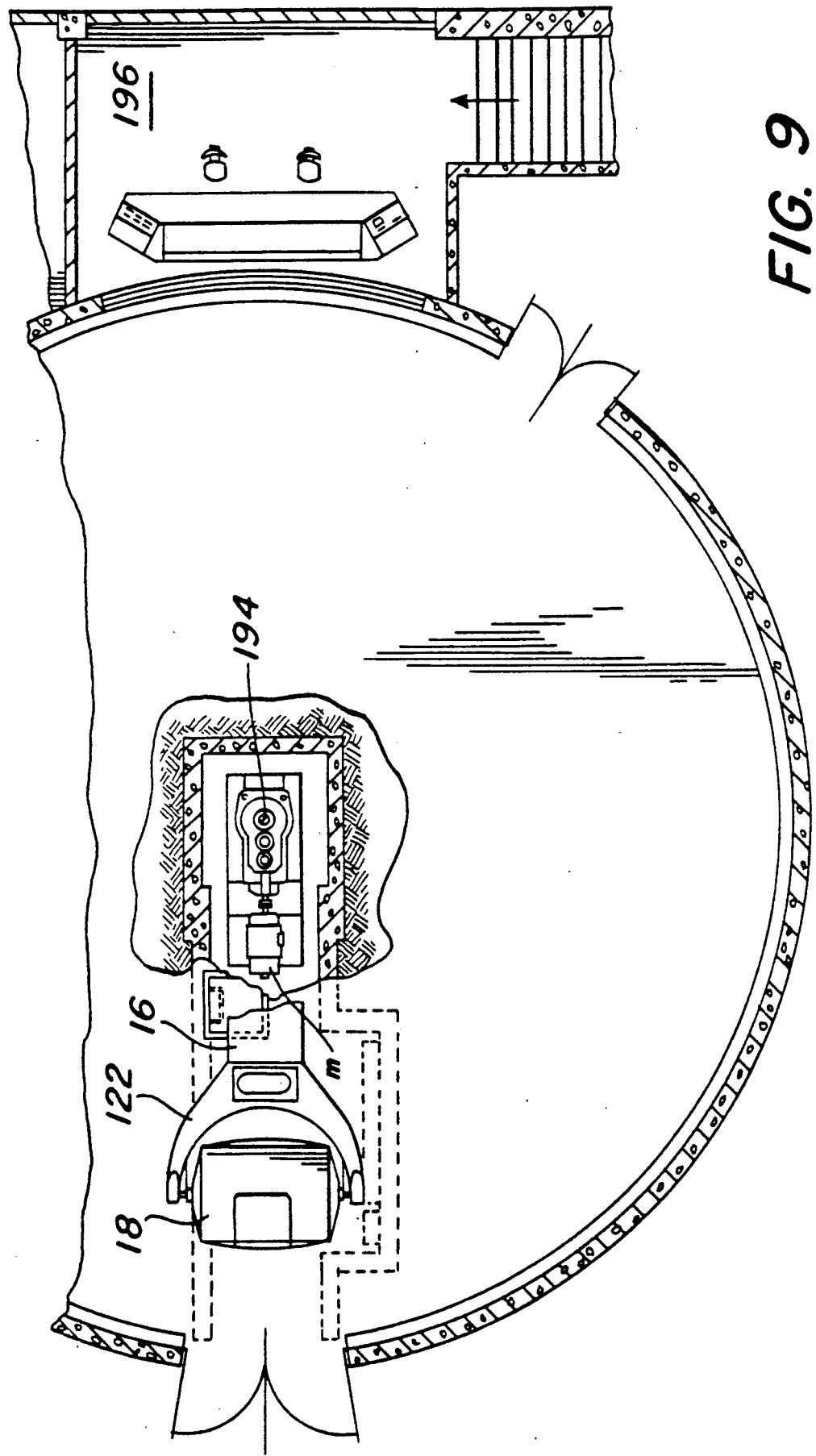
FIG. 9 is a top plan of the installation in FIG. 8 showing the gondola-yoke mount.

Referring to FIG. 8, all computers, except for computer 24, are located at a remote room enclosure 196 which is preferably elevated above ground level. Electrical wiring from and to the computers and associated peripheral equipment in room enclosure 196 is fed through suitable wall and ceiling conduits to a sleeve 198 which is part of a slip ring assembly including slip rings 40, 50, 54 and 59. Electrical wiring interconnecting the motion control computer 30 to the controller 31 for motor M is fed through suitable wall and ground conduits.

Figure 6:
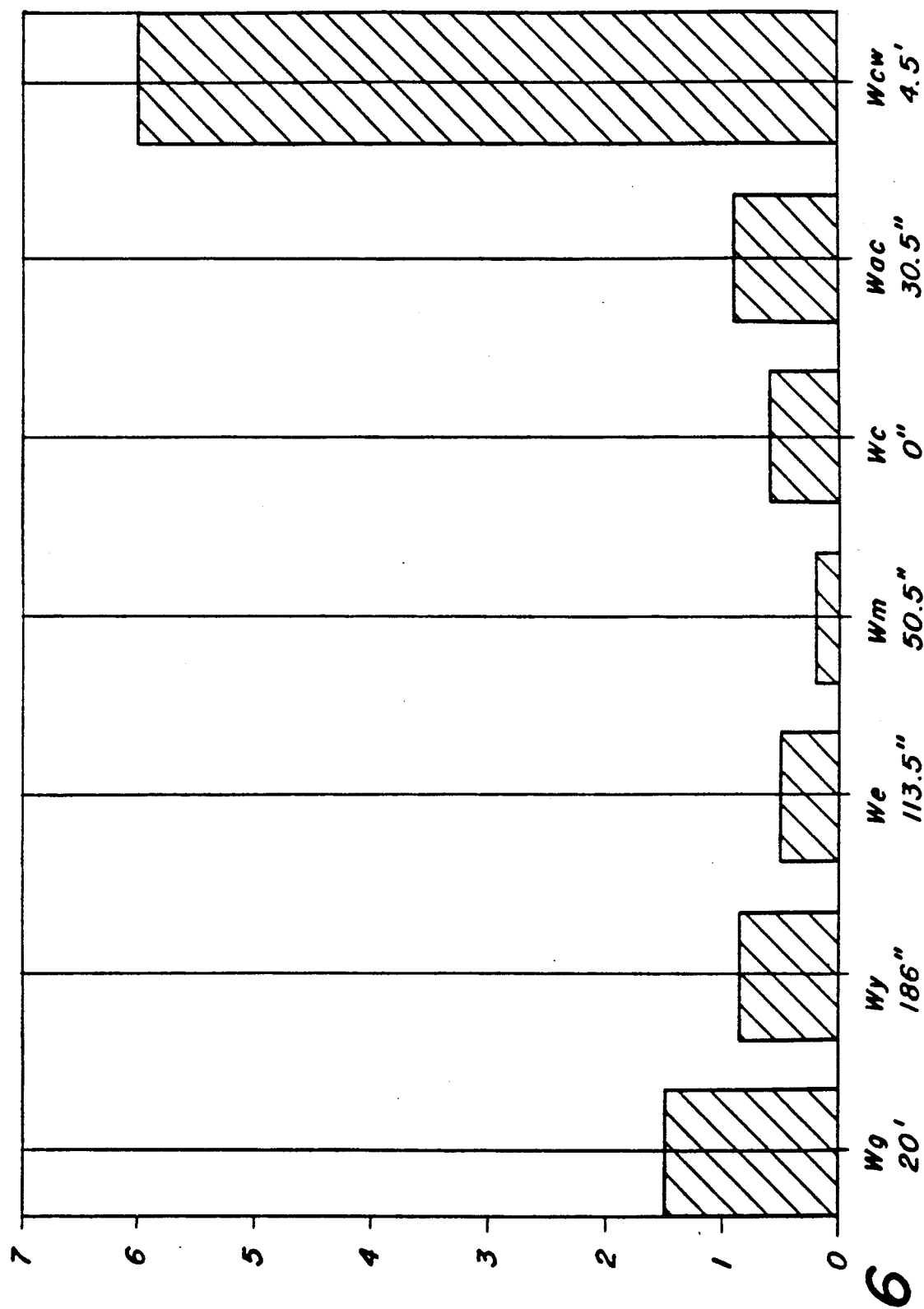
FIG. 6 is a bar graph showing a preferred weight distribution for the trainer.

A preferred weight distribution of the g force trainer 10 along the longitudinal axis of arm 16 is shown in FIG. 6 taking the zero reference at the vertical axis of rotation of shaft 154, i.e., at the longitudinal axis of the shaft. W represents the weight of the gondola. Wc represents the weight of a portion of arm section 60 centered on and extending a distance of 2 feet to the right and 2 feet to the left of the axis of rotation of shaft 154. Wm represents the weight of a middle portion of arm section 86 centered at 50.5" to the left of the zero reference and extending a distance of 77 inches between the axis of rotation of shaft 154 and seam weld 66. We represents the weight of an end portion of arm section 60 centered at 113.5" to the left of the zero reference and extending 73 inches between seam welds 66 and 126. Wy represents the weight of the yoke 122 including the shaft bearings and is centered at approximately 186" to the left of the zero reference. Wac represents the weight of the end portion of arm section 60 centered at 30.5" to the right of the zero reference and extending 13 inches between flange plate 112 and the axis of rotation of shaft 154, the distance between the axis of rotation of shaft 154 and flange plate 112 itself being approximately 37 inches. Wcw represents the total weight of counterweight 116 and counterweight plates 118 centered at 4.5 feet to the right of the zero reference point.

The weight distribution by approximate percentages, corresponding to FIG. 6, is shown in Table 1.

TABLE 1

| Component | Percentage Weight |
|---|---|
| W | 14.2 |
| Wy | 8.2 |

TABLE 1-continued

| Component | Percentage Weight |
|---|---|
| We | 4.6 |
| Wm | 1.9 |
| Wc | 5.7 |
| Wac | 8.5 |
| Wcw | 56.9 |

Other preferred dimensions of the g force trainer having the weight distribution shown in FIG. 6 are as follows. The arm section 60 is approximately 41.93 inches wide and 17.88 inches high. Gondola arm section 58 is approximately 41.28 inches wide and 17.64 inches high. Each of flange plates 112, 114 is approximately 0.87 inches thick. The length of gondola arm 18 is 187 inches from flange plate 112 to seam weld 126. Yoke arms 136, 138 are approximately 113.50 inches apart at their ends. Enclosure 120, at its distal end with respect to the axis of rotation of shaft 154, is approximately 48 inches wide and 60 inches high. The bottom walls of the yoke 122 and arm 16 are approximately 50.95 inches above ground level. The axes of gondola pivot shafts 140, 140' are approximately 240 inches from the axis of rotation of shaft 154.

Figure 7:
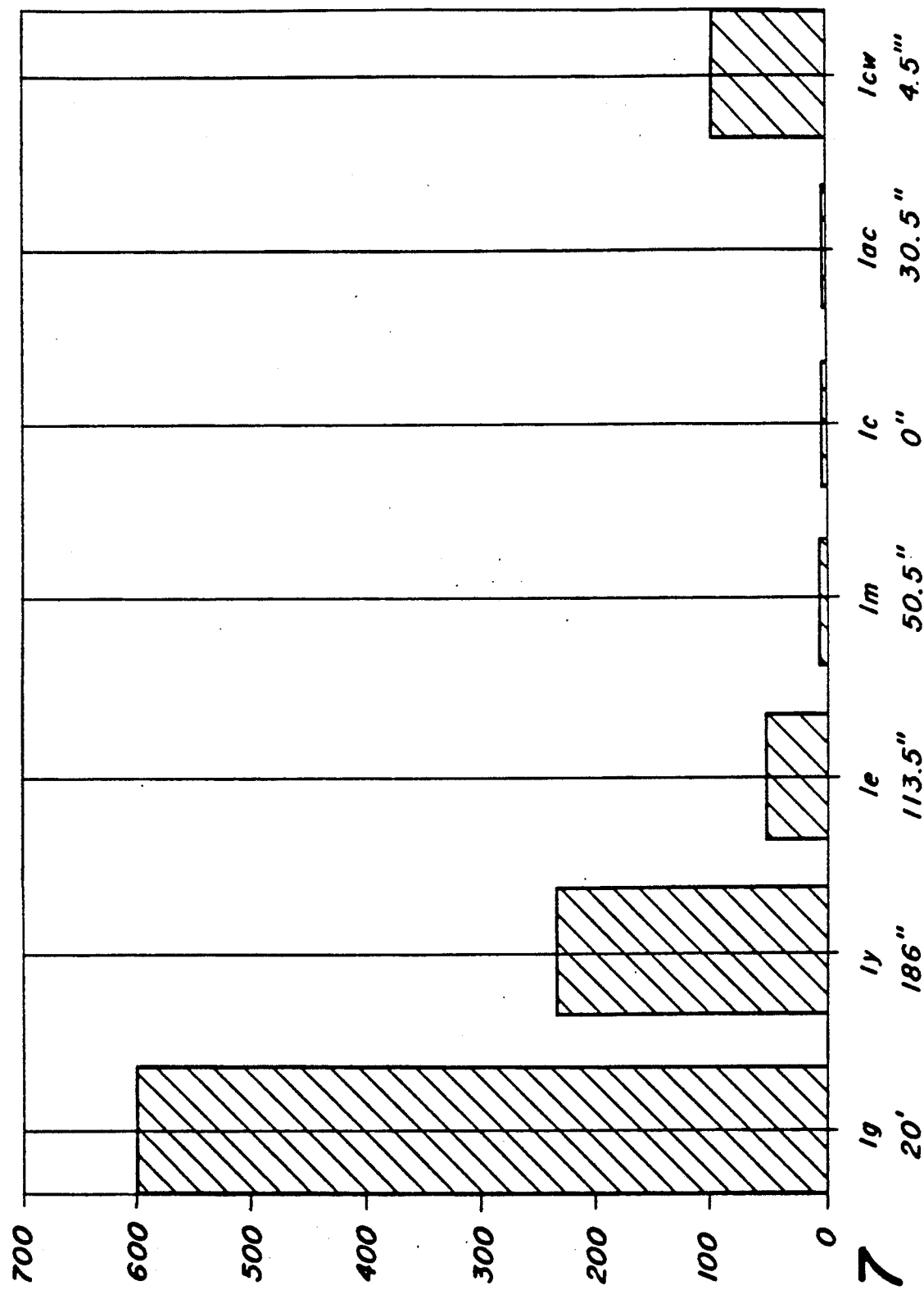
FIG. 7 is a bar graph showing a preferred inertial distribution for the trainer.

A preferred inertial distribution for the g force trainer 10 having the weight distribution of FIG. 6 is shown in FIG. 7. Ig represents the moment of inertia of the gondola. Ic represents the moment of inertia of the portion of the gondola arm 16 centered on and extending two feet to the left and two feet to the right of the axis of rotation of shaft 154 (zero reference). Im represents the moment of inertia of the portion of arm 16 centered at 50.5" to the left of the zero reference and extending 77 inches between the axis of rotation of shaft 154 and seam weld 66. Ie represents the moment of inertia of the end portion of arm 16 centered at 113.5" to the left of the zero reference and extending between seam welds 66 and 126. Iy represents the moment of inertia of yoke 122 centered at approximately 186" to the left of the zero reference and extending from seam weld 126 to the left in FIG. 3. Iac represents the moment of inertia of the end portion of arm section 60 centered at 30.5" to the right of the zero reference and extending 13 inches from flange plate 112 towards the axis of rotation of shaft 154. Icw represents the moment of inertia of the counterweight 116 and counterweight plates 118 centered at 4.5 feet to the right of the zero reference.

The inertial distribution by approximate percentages, corresponding to FIG. 7, is shown in Table 2 below.

TABLE 2

| Component | Percentage Inertia |
|---|---|
| Ig | 60.8 |
| Iy | 23.7 |
| Ie | 5.0 |
| Im | 0.5 |
| Ic | 0.1 |
| Iac | 0.2 |
| Icw | 9.7 |

From the foregoing, it should be evident that arm 16 and yoke 122 form a unified body which is secured to hub 14 at one end and which supports the gondola 18 at the other end. The entire assembly is lightweight yet robust and can be rotated by low hp motor M at speeds as high as 47 rpm (corresponding to 15 $g_z$ at the gondola).

When the g-force trainer is at rest, the gondola 18 is upright. As the shaft 154 is driven by motor M so as to swing the arm 16 about the axis of rotation of shaft 154, the gondola 18 describes a circle having a 240 inch radius centered on the axis of rotation of shaft 154. The gondola is mounted for rotation on pivot shafts 144 (144'), FIG. 3A, which define an axis of rotation (roll axis) for the gondola which is tangent to the circle. For "$g_z$" tolerance training, the pilot chair is positioned so that the pilot is tilted approximately 13°–30° back from the vertical and faces the direction of travel of the gondola along the tangent line. The center of gravity of the loaded gondola is located below the axis defined by pivot shafts 144, 144'. Accordingly, as the speed of rotation of shaft 154 increases, the center of gravity of the gondola swings outwardly and the gondola rolls away from the upright position, rotating about the axis defined by pivot shafts 144 (144'). The $g_z$ force along a line or axis extending through the seat of the pilot chair increases as the gondola rolls away from the upright position due to increasing arm speed and decreases as the gondola rolls towards the upright position due to decreasing arm speed. The axis is designated Pv in FIG. 1 when the gondola is at rest and upright and is designated Pt when the gondola is tilted or rolled due to acceleration of arm 16. The amount of gondola tilt or roll, hence orientation of the Pt axis, is proportional to the speed of the arm. For each value of arm speed, then, there is a corresponding value of gondola roll angle and $g_z$ force. As previously indicated, a look up table in the motion control computer memory contains corresponding values of desired $g_z$ force, roll angle and motor speed. The motion control computer accesses the look up table to retrieve the desired motor speed values based on the $g_z$ force commands provided by the pilot joystick (pilot mode), $g_z$-dial (manual mode) or stored $g_z$ profile (profile mode).

OPERATION

Figure 15:
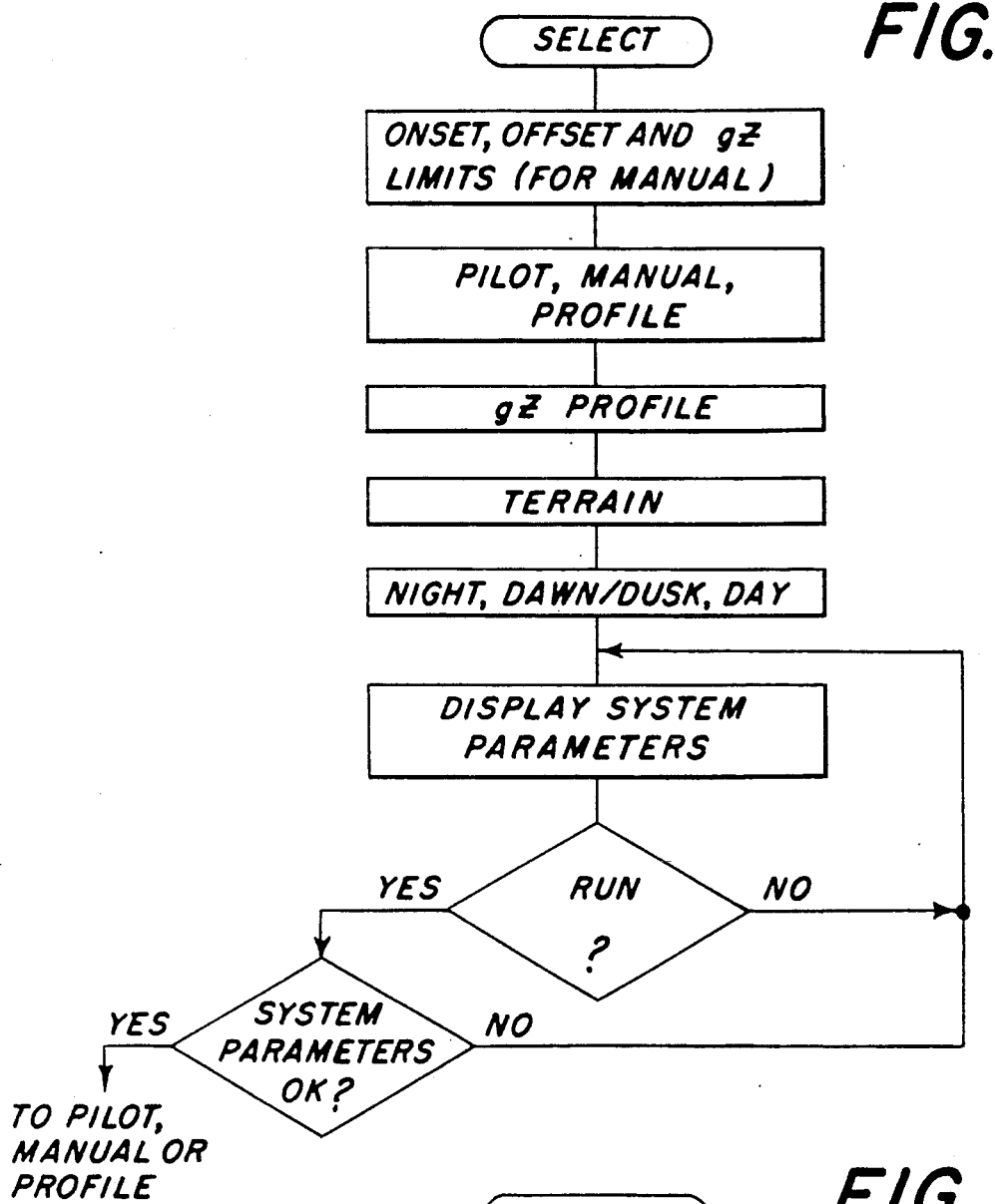
FIG. 15 is a flow chart of a portion of the programmed operation of the g-force trainer.

The g force trainer is operable in the pilot, manual or profile mode. Referring to the flow chart appearing in FIG. 15, personnel at the remote station 20 select the mode of operation via a keyboard 200 (FIG. 2). The keyboard is connected via computer 28 and the RS422 link to computer 30. The remote station personnel may enter an onset rate limit value and an offset rate limit value, i.e., limit values for increasing and decreasing time rates of change of the desired $g_z$ force, via keyboard 200 for use in the manual mode. The values are stored in memory in computer 30. The mode of operation, pilot, manual or profile, is selected together with a $g_z$ profile (except if the manual mode is being selected) via the keyboard. The $g_z$ profile includes a sequence of values of $g_z$ force, onset (or offset) rate and time including a $g_z$ value corresponding to an idle (initial) arm speed. The $g_z$ profile is one of several which are stored in hard disk, the selected profile being loaded into the motion control computer memory. The $g_z$ profile may represent the profile for a target (pilot mode) or a test profile for the pilot (profile mode).

The content of the visual display for screen 34 is then selected, via keyboard 202, by choosing (or not choosing) a graphics display simulating terrain, and by choosing a graphics background either simulating night, dawn/dusk or day light conditions. The graphics display data is stored in memory in computer 32 and is retrieved based on the keyboard operation. The status of various system components such as sensed roll angle, g-suit pressure, brake pressure, etc., as indicated by sensors distributed throughout the system, are then displayed on screen 57 (FIG. 14A) under command of graphics computer 28. Such sensors are connected, via slip rings mounted on the driven shaft, to motion control computer 30 which transmits the sensor output information to computer 28. Computer 28 operates screen 57 to display the status of the system components. See FIG. 14A.

A "run" key on keyboard 200 is then actuated to begin system operation. If the status of each system component is acceptable, as determined by motion control computer 30, the computer enters the selected mode of operation: pilot, manual or profile.

PILOT MODE

Figure 12:
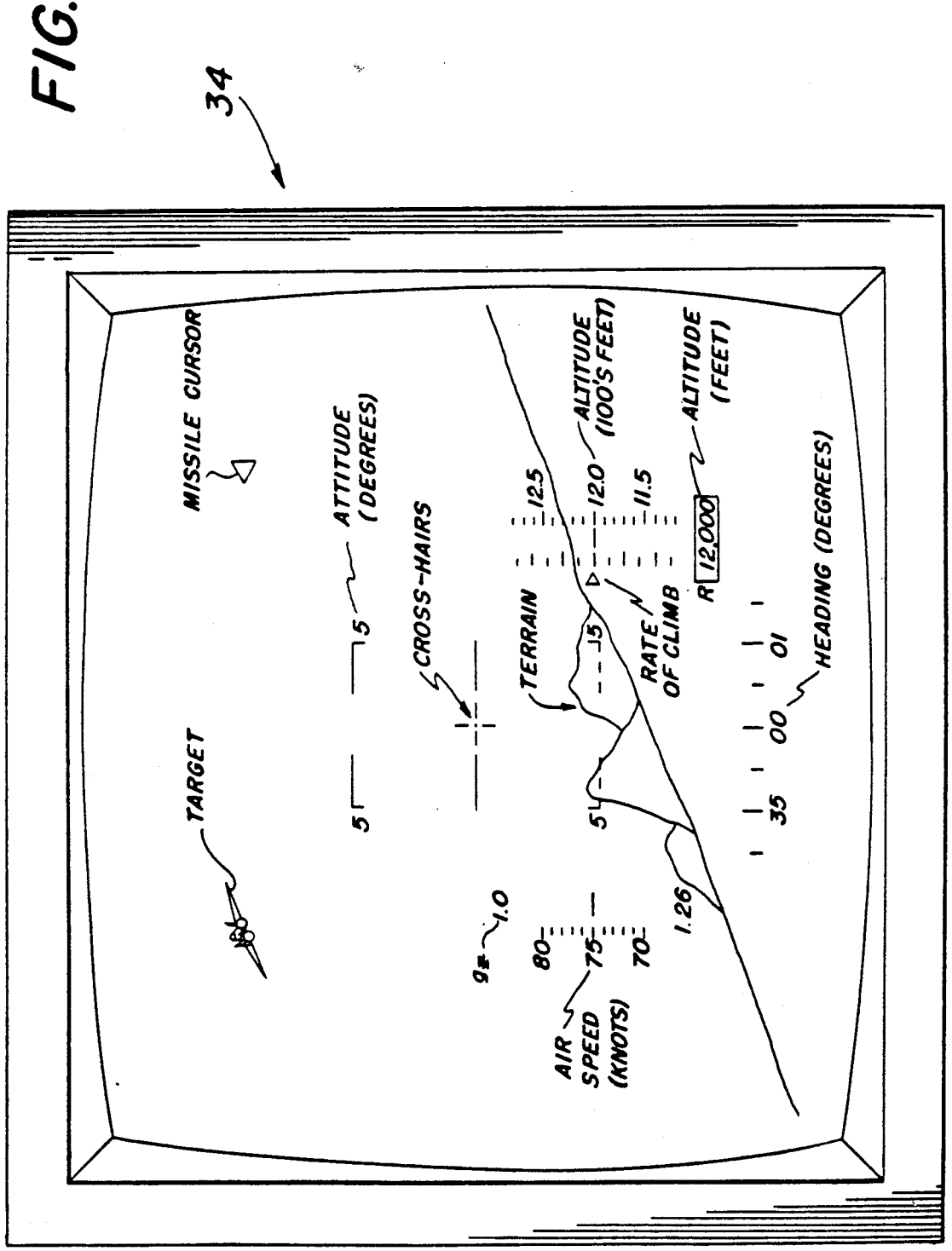
FIG. 12 shows the visual display at the gondola, having a heads up display field and target display field.
Figure 16A:
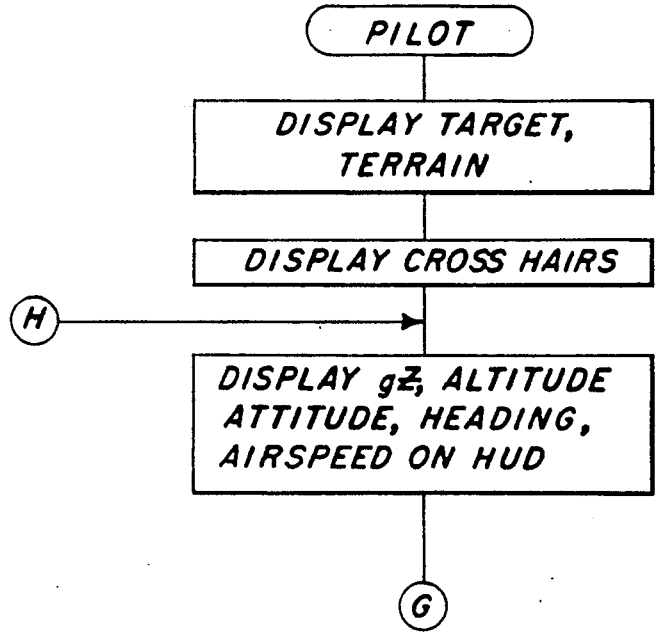
FIGS. 16A and 16B are a flow chart of programmed operation in the pilot mode.
Figure 16B:
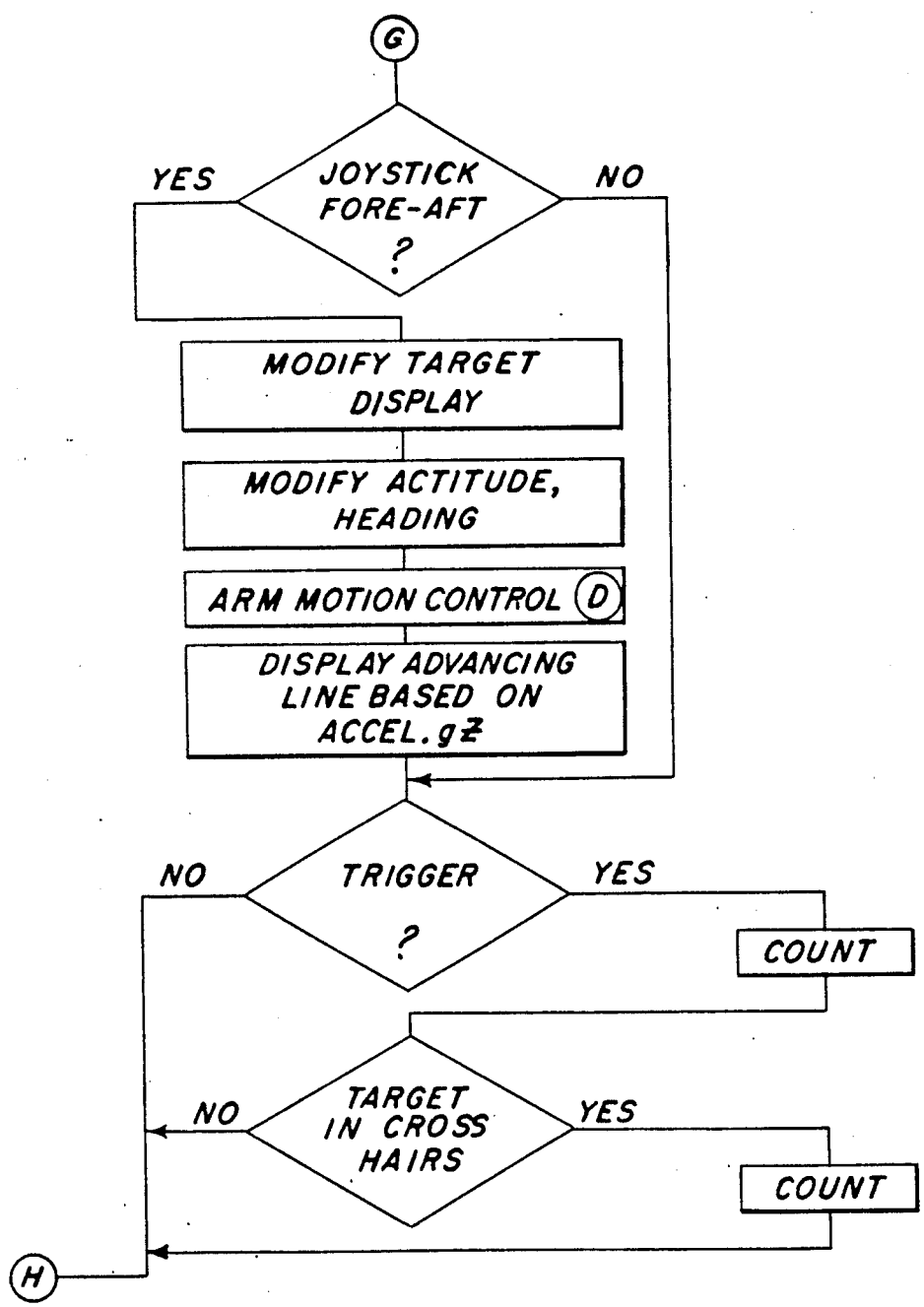

Referring to FIGS. 16A and 16B, in the pilot mode the graphics computer 32 operates screen 34 at the gondola so as to display the terrain selected (if any), the target image, and the index image (cross hairs) on the target display field. See FIG. 12. Computer 32 also operates screen 34 so as to display a numeric indication of instantaneous $g_z$ force exerted on the pilot, i.e. actual $g_z$ force at the gondola, based on the $g_z$ accelerometer output. The $g_z$ accelerometer output is received over the RS232 link from motion control computer 30. Computer 32 also operates screen 34 to display the altitude, attitude, heading, air speed, and rate of climb on the heads up display field. See FIG. 12. Attitude is indicated based on the sensed gondola roll angle value. Alternatively, the attitude indication may be based on $g_z$ accelerometer output (sensed $g_z$) and the corresponding look up table values for gondola roll angle, or it may be based on left-right joystick motion as indicated by a second joystick potentiometer output. Heading is indicated by a dual digit degree scale at the bottom of screen 34 and is based on attitude.

In the pilot mode, computer 32 causes the target image to move relative to the cross hairs, across the target display field, based on the selected $g_z$ profile, i.e., the stored sequence of $g_z$ values and onset (or offset) rates retrieved from memory in computer 30. As the target moves across the target field on screen 34, the pilot operates joystick 38 to "track" the target, i.e., to center the cross hairs on the target image.

Referring to FIG. 16B, data representative of desired $g_z$ force and onset (or offset) rate based on fore or aft displacement of the joystick appears at the joystick potentiometer output. The potentiometer output is transmitted via slip rings 50 to motion control computer 30 as previously explained. The motion control computer enters point D of the arm motion control program (FIG. 19A), accesses the look up table to retrieve the motor speed value corresponding to the desired $g_z$ force, and generates the motion control signals which command the motor controller 31 so as to alter the speed of rotation of arm 16. As arm speed changes, the gondola roll angle changes as does the $g_z$ force exerted on the pilot. The $g_z$ force changes are reflected in the $g_z$ accelerometer output which is transmitted to computer 28 via computer 30 and the RS422 link.

Figure 13:
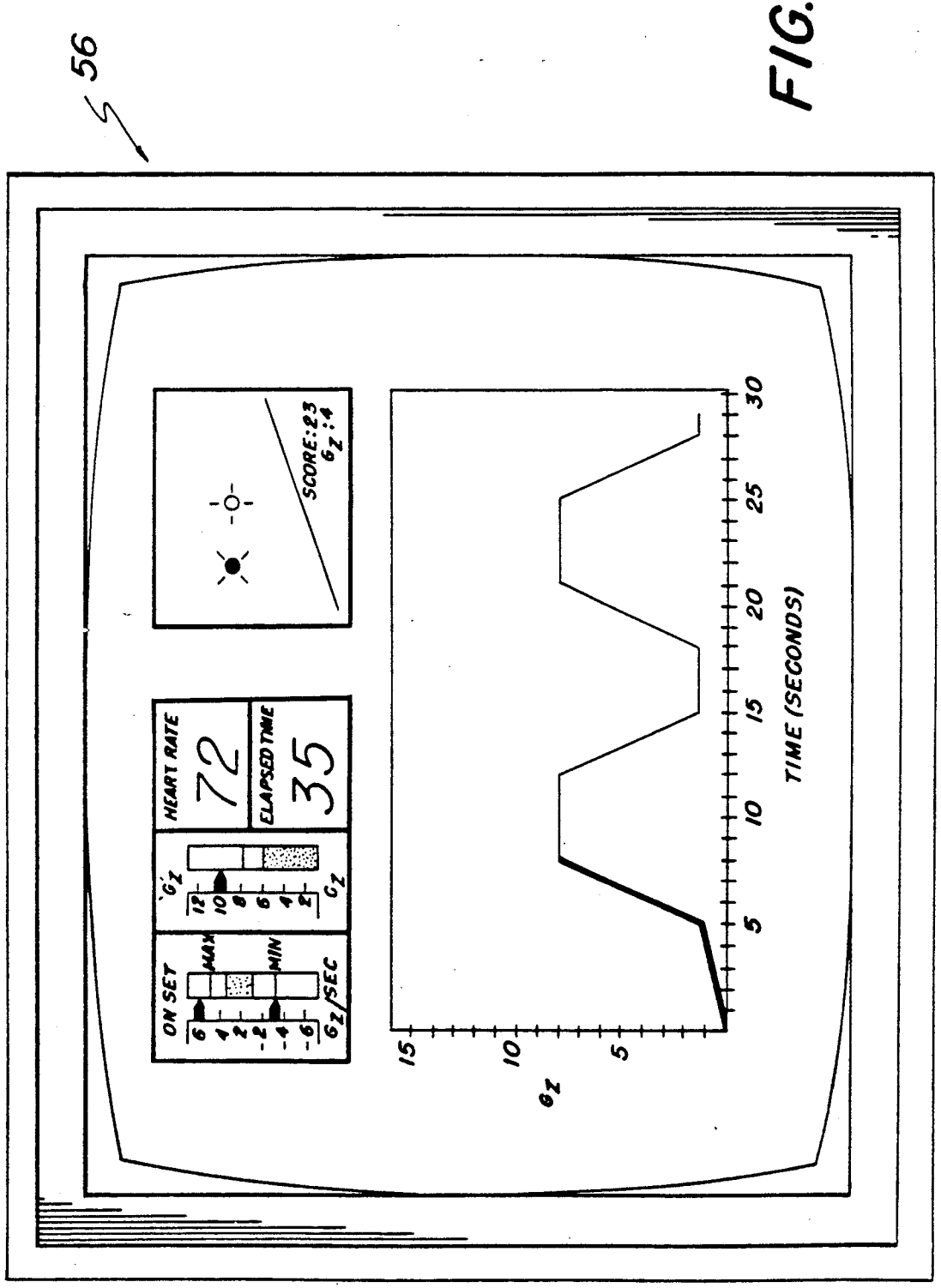
FIG. 13 shows the visual display at one remote console, having an advancing line image representing $g_z$ force.
Figure 14B:
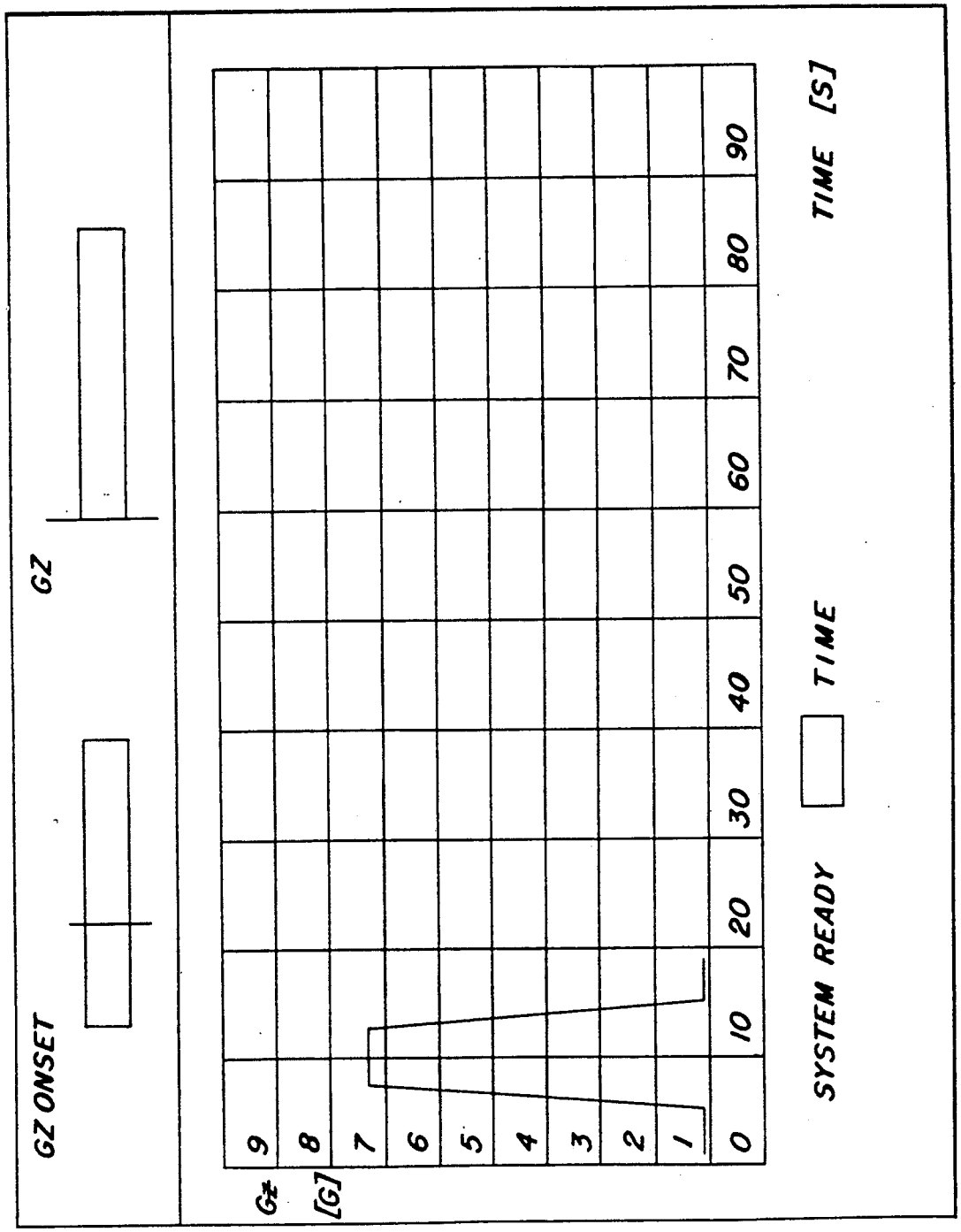

Computer 28 operates screens 56 and 57 to display an advancing line image of the $g_z$ values indicated by the accelerometer output on a set of $g_z$-time axes as best shown in FIGS. 13 and 14B. The end of the advancing line image represents the instantaneous $g_z$ force exerted on the pilot, and the remainder or tail of the line image represents the history of $g_z$ values experienced by the pilot as he "tracks" the target by operating joystick 48.

The advancing line image is superimposed on a fixed line image which is displayed on screens 56 and 57 under command of computer 28. The fixed line image represents the $g_z$ profile which will be "executed" by the target, i.e., the $g_z$ values and onset (or offset) rates which make up the $g_z$ profile initially selected by the remote station personnel. The degree of deviation between the advancing line image and the fixed line image, if any, indicates to the remote station personnel the level of performance of the pilot in attempting to "track" the target in the pilot mode.

Actual $g_z$ value at the gondola is also displayed numerically in the pilot mode via computers 28 and 32 (via computer 30 and the RS links) on screen 34, 56 and 57. See FIGS. 13, 14A and 14B. The computer 28 also operates screen 56, based on the time rate of change of the $g_z$ accelerometer output (computed by computer 30), so as to display a numeric indication of actual onset (or offset) rate, i.e., the instantaneous time rate of change of the $g_z$ force exerted on the pilot.

If the pilot operates joystick 48 to successfully "track" the target, the target image is brought within the cross hairs. The pilot may then operate trigger switch 27 to "fire" a miss+le at the target, although the trigger switch is free to be operated by the pilot at any time. Whenever the trigger switch is operated, computer 32 increments a first (software) counter by one. If the target image is within the cross hairs at the time of operation of the trigger switch, computer 32 increments a second (software) counter by one, otherwise the second counter is not incremented. Preferably, the count maintained in the second counter is displayed for viewing by the remote station personnel on screen 56 under command of computer 28 (via computer 30 and the RS links).

PROFILE MODE

Figure 17:
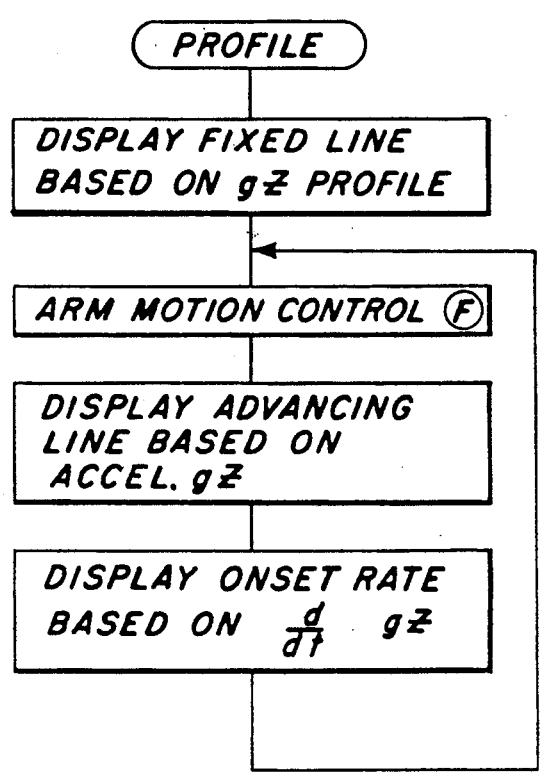
FIG. 17 is a flow chart of programmed operation in the profile mode.

Referring to FIG. 17, in the profile mode the computer 28 operates screens 56 and 57 to display a fixed line image representing the stored $g_z$ profile initially selected by the remote station personnel. The selected $g_z$ profile represents the sequence of desired $g_z$ forces and onset (or offset) rates which the pilot is to experience during a test or run in the profile mode. The motion control computer 30 enters the arm motion control program at point F (FIG. 19A), sequentially accesses the stored $g_z$ profile data, accesses the look up table to retrieve the motor speed value corresponding to the value of desired $g_z$ force retrieved from the $g_z$ profile, and generates the motion control signals which command the motor controller 31 so as to alter the speed of rotation of arm 16.

The computer 28 operates screens 56 and 57 as previously described so as to display an advancing line image of the actual $g_z$ values and onset (or offset) rates based on the $g_z$ accelerometer output. As in the pilot mode, the end of the advancing line image represents the instantaneous $g_z$ force exerted on the pilot, and it also indicates to the remote station personnel the stage of the test or run. Instantaneous (actual) $g_z$ value is also displayed as previously described under command of computer 28 on screens 56 and 57. The computer 28 also operates screen 56 as previously described so as to display a numeric indication of onset (or offset) rate, i.e., the instantaneous time rate of change of the $g_z$ force exerted on the pilot.

MANUAL MODE

Figure 18:
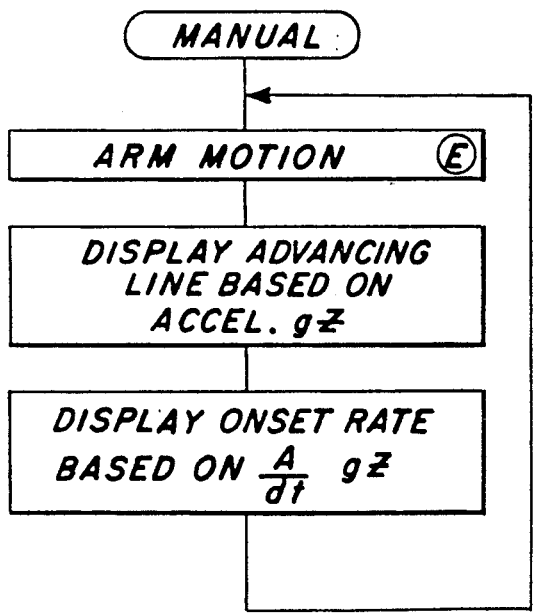
FIG. 18 is a flow chart of programmed operation in the manual mode.

Referring to FIG. 18, in the manual mode the motion control computer 30 enters the arm motion control program at point E (FIG. 19A) and commands the motor controller 31 so as to alter the speed of rotation of arm 16 based on the $g_z$-dial potentiometer output. The $g_z$-dial potentiometer is under control of the remote station personnel. The output of the $g_z$-dial potentiometer represents desired $g_z$ force level. The desired onset (and offset rate is inputted to the motion control computer (via compute 28 and the RS422 link) by keyboard 200 or by the outputs of separate presettable onset- and offset- dial potentiometers (not shown. The motion control computer accesses the look up table to retrieve the motor speed value corresponding to the desired $g_z$ force and generates the motion control signals which command motor controller 31 so as to vary the arm speed. The $g_z$ forces experienced by the pilot in the manual mode are therefore based on operation of the $g_z$-dial and keyboard (or separate onset- or offset- dial potentiometers) by the remote station personnel.

In the manual mode, the computer 28 operates screens 56 and 57 based on the $g_z$ accelerometer output to display the advancing line image representing $g_z$ force exerted on the pilot, as previously described. The computer 28 also commands screen 56 and 57 to numerically display instantaneous (actual) $g_z$ force, based on the $g_z$ accelerometer output. Computer 28 also operates display 56 to indicate actual onset (or offset) rate based on time rate of change of $g_z$ accelerometer output computed by computer 30.

ARM MOTION CONTROL

Figure 19A:
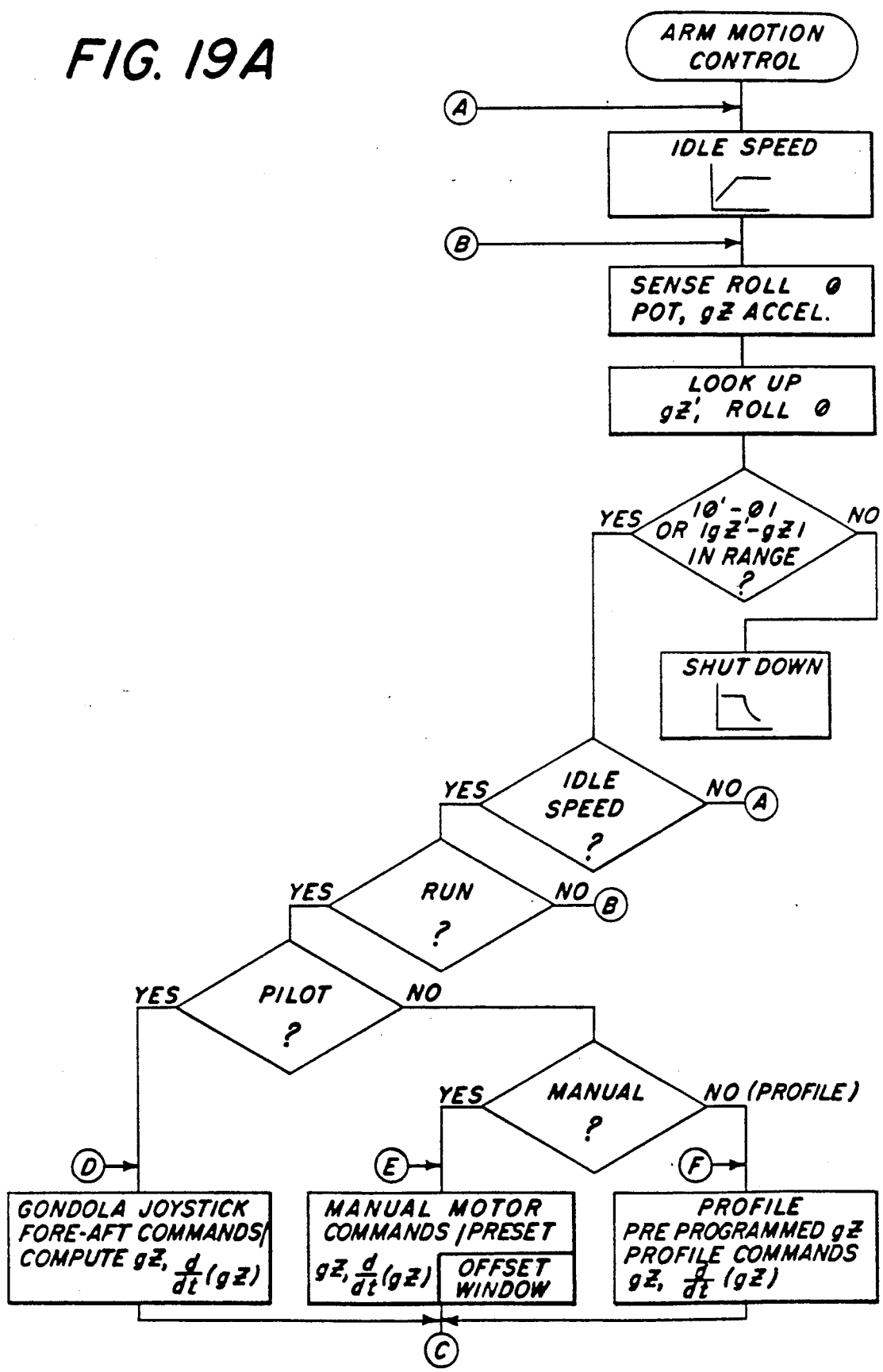
FIGS. 19A and 19B are a flow chart of the arm motion control portion of the program.
Figure 19B:
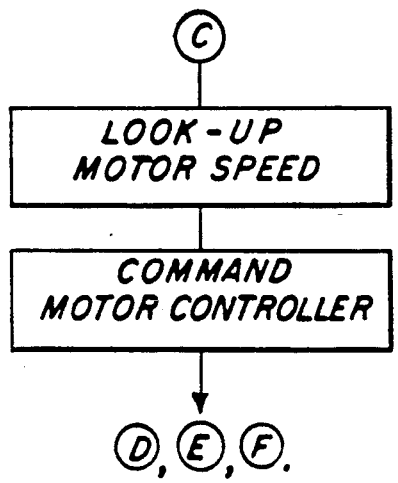

Details of the arm motion control portion of the program are best explained in connection with FIGS. 19A and 19B. Referring to FIG. 19A, for any selected mode of operation (pilot, profile or manual), the motion control computer 30 initially accesses the look up table, retrieves a pre-determined sequence of motor speed values, and generates a corresponding sequence of motion control signals which command motor controller 31 so as to accelerate arm 16 from rest to an idle or steady speed. As arm speed is brought up to idle speed, the motion control computer retrieves the $g_z$ force roll angle and arm speed values in the look up table corresponding- to the retrieved motor speed values. The computer compares the retrieved $g_z$, roll angle and arm speed values to the actual (sensed) $g_z$, roll angle and arm speed values as indicated by the $g_z$ accelerometer output, the roll angle potentiometer output and the motor tachometer (T) output respectively. If a comparison results in a difference which falls outside a pre-determined range, the motion control computer enters a shut down routine wherein the arm is decelerated to rest. If in each case the comparison (difference) lies within range, the computer 30 checks whether idle speed has been reached by retrieving from the look up table the $g_z$ value corresponding to the motor speed value for idle speed and by comparing the retrieved $g_z$ value to the output of the $g_z$ accelerometer. If the actual arm speed has reached idle speed, the comparison results in a match. The motion control computer then checks whether a "run" button, at the remote station, has been operated. If so, the motion control computer then checks whether the pilot, manual or profile mode has been selected.

If the pilot mode has been selected, the motion control computer retrieves a motor speed value from the look up table corresponding to the desired $g_z$ value called for by the joystick potentiometer output. The computer generates a motion control signal which represents desired or set point motor speed (hence arm speed) based on the retrieved motor speed value. The motion control computer 30 also compares the onset (or offset) rate called for by the joystick potentiometer output to a limit value which is stored in the selected $g_z$ target profile. Thus, preferably there is a limit to the magnitude of onset (or offset) rate which can be effected, depending on the initial or idle speed. For example, for an idle speed of 12.31 rpm, the limit for the onset (or offset) rate is 10.1 g's/second. Similarly, for an idle speed of 9.80 rpm, the limit for the onset (or offset) rate is 6.0 g's/second. If the limit value is exceeded, the computer ignores the rate called for by the joystick potentiometer output and selects a motor speed value from the look up table which does not produce an onset (or offset) rate exceeding the limit value. The computer 30 then uses this retrieved motor speed value to generate the motion control signal. In response, motor controller 31 drives motor M so as to gradually bring the motor speed (hence arm speed) to a value which results in the $g_z$ force called for by the joystick potentiometer output, changing the motor speed (hence arm speed) at a rate which will produce an onset (or offset) rate within limits.

If the manual mode has been selected, the motion control computer 30 retrieves a motor speed value from the look up table corresponding to the $g_z$ value called for by the $g_z$-dial and it generates a motion control signal based on the retrieved motor speed value as previously described. The motor controller 31 drives the motor M so as to gradually bring the motor speed (hence arm speed) to a value which results in the $g_z$ force called for by the $g_z$-dial potentiometer output, changing the motor speed (hence arm speed) at a rate which will produce the onset rate called for by the keyboard (or by an onset-dial potentiometer output.) The motion control computer holds the arm speed so as to maintain the $g_z$ force at the preset level of a predetermined interval of time ("offset window" or until the operator actuates an "offset" switch connected to the motion control computer, whichever occurs first. The motion control computer then decelerates the arm (by changing motor speed) at the desired offset rate called for by the keyboard (or by an offset-dial potentiometer output). If the onset (or offset) rate called for exceeds the limit value initially selected and stored in memory, the motion control computer ignores the onset (or offset) rate and retrieves a motor speed value from the look up table which results in an onset (or offset) rate which does not exceed the limit value.

If the profile mode has been selected, the motion control computer sequentially retrieves the desired $g_z$ values from the stored $g_z$ profile initially selected by the remote station personnel. These values are used to access the look up table and retrieve therefrom corresponding motor speed values. The motion control signals are generated based on the retrieved motor speed values, as previously described, and bring the motor speed (hence arm speed) to a speed which results in the desired $g_z$ value retrieved from the stored profile. The motor speed (hence arm speed) is changed to obtain the value of onset (or offset) rate stored in the selected $g_z$ profile corresponding to the desired $g_z$ value.

Figure 20:
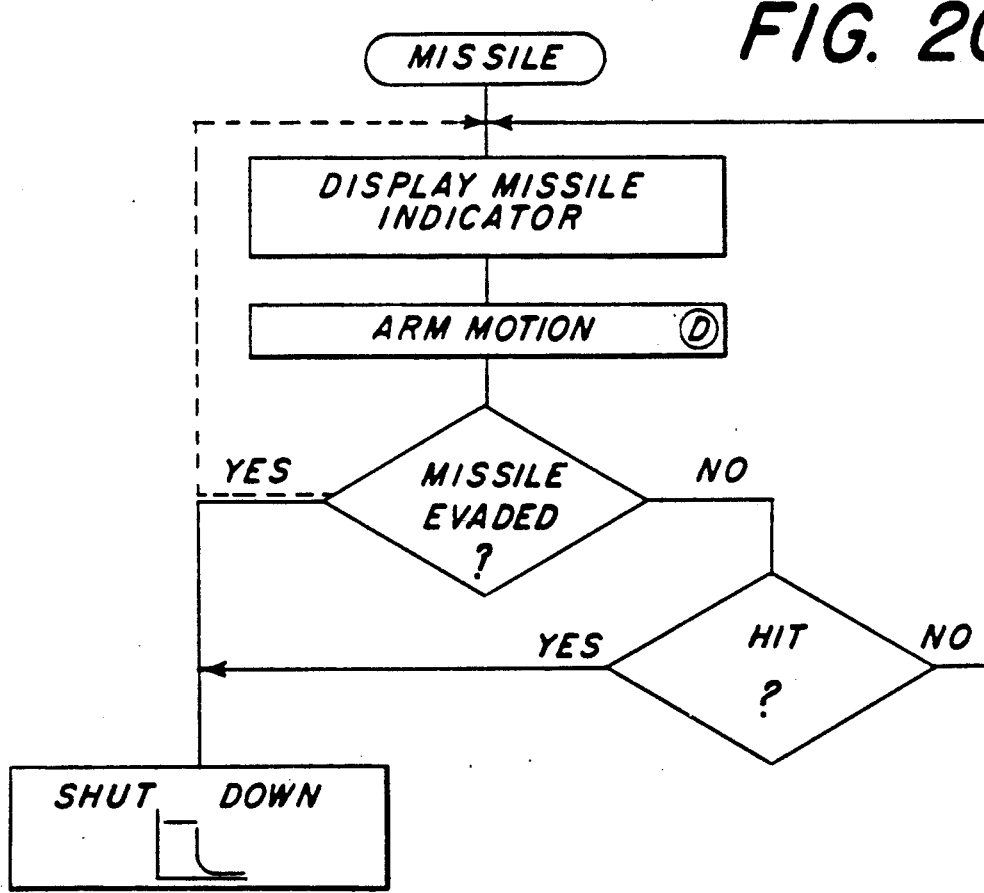
FIG. 20 is a flow chart of the missile avoidance portion of the program for the pilot mode.
Figure 25:
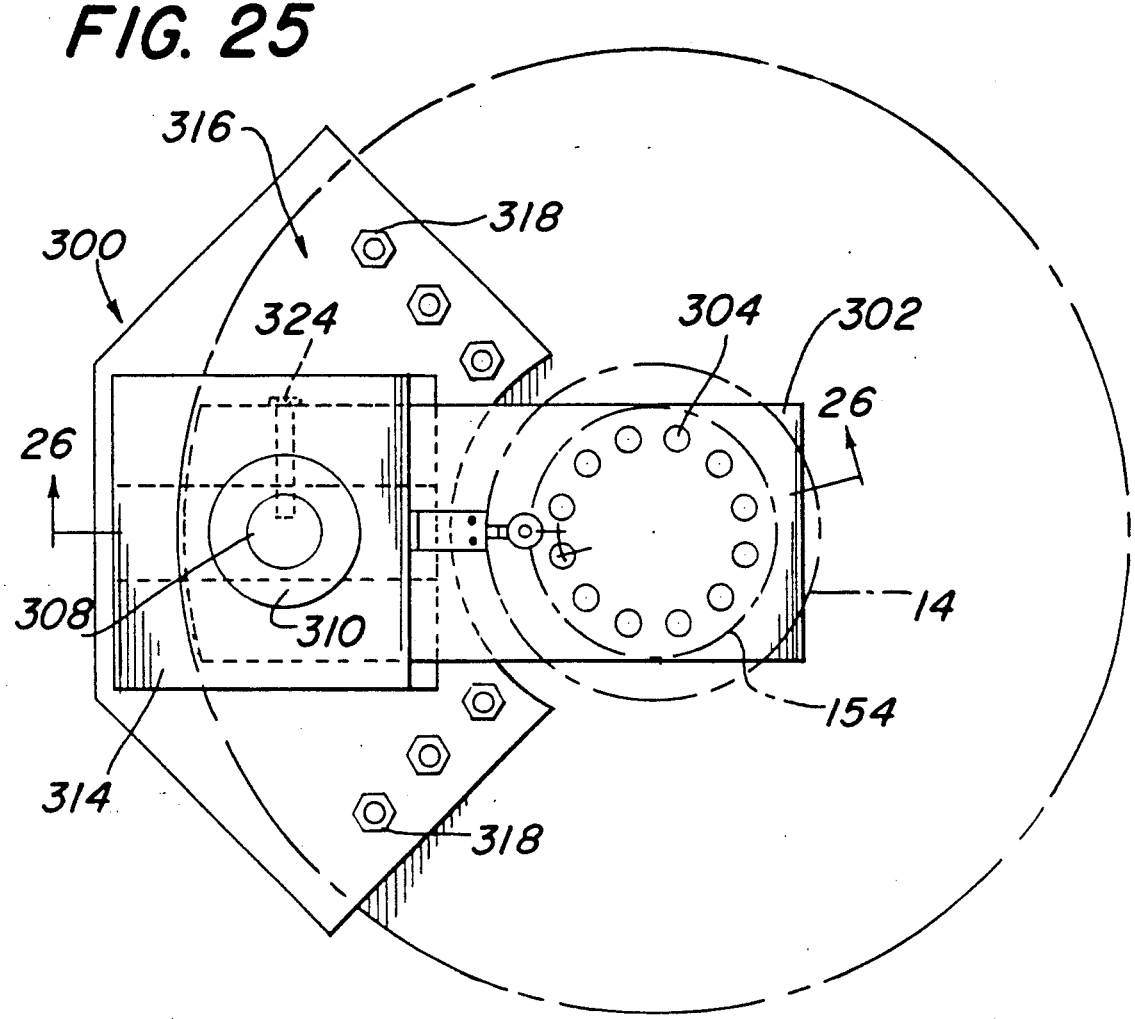
FIG. 25 is a top plan view of a freewheeling arm safety including a break-away shear pin for coupling the drive shaft to the arm.
Figure 26:
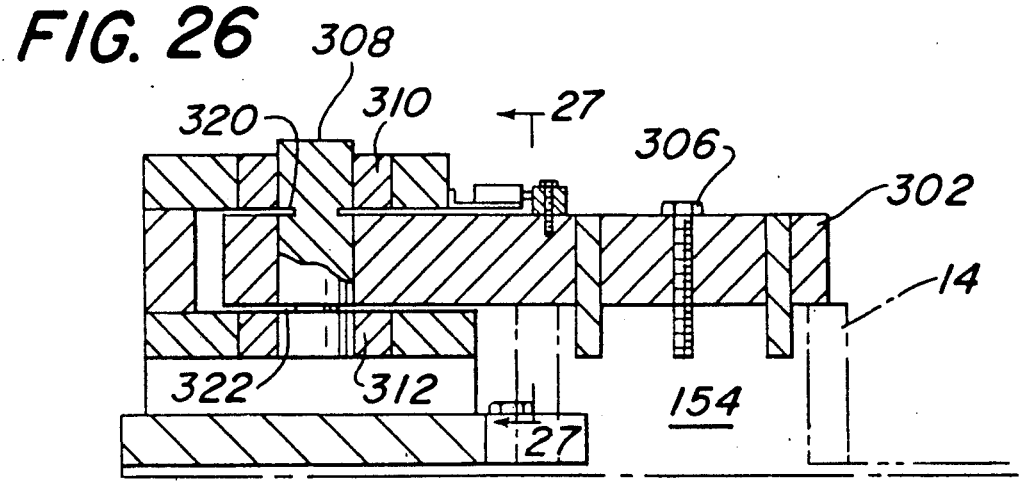
FIG. 26 is a section taken along 26—26 in FIG. 25
Figure 27:
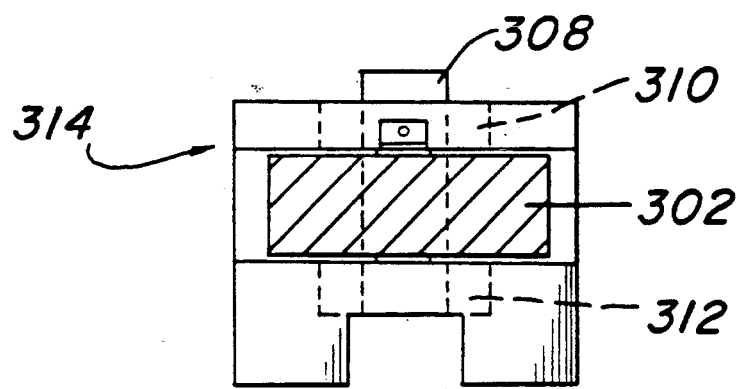
FIG. 27 is a section taken along 27—27 in FIG. 26

Referring to FIG. 20, there is shown a flow chart of operation of the g force trainer in the pilot mode wherein the pilot's ability to "evade" a missile can be tested. The computer 32 commands screen 34 located at gondola 18, so as to display a cursor or marker indicating the position of a missile relative to the aircraft. The cursor is caused to appear at various sequential positions on the screen, relative to the cross hairs, based on preprogrammed data stored in memory. The collection of cursor positions on screen 34 represents a preselected $g_z$ profile for the missile.

As the cursor traverses the screen, the pilot operates the joystick to execute an evasive maneuver. The arm speed is controlled based on pilot joystick fore-aft motion as previously described. Thus, the motion control computer 30 retrieves the desired motor speed values from the memory look up table, based on the $g_z$ values called for by joystick displacement. If the difference between the $g_z$ value called for by the joystick potentiometer and the $g_z$ value retrieved from the missile profile exceeds a preselected threshold at any instant of time, indicating that the missile has been "evaded", the computer 30 enters a shut down routine wherein the motion control signal is varied so as to gradually bring the motor (hence arm) to rest. (If desired, however, the computer may return to the start of the routine, as shown in phantom lines in FIG. 20, whereby another missile is displayed on screen 34 and the foregoing process is repeated.) The computer 28 can also display a message on screen 34 to indicate to the pilot that he/she has successfully "evaded" the missile. Similarly, if the pilot has not been able to "evade" the missile, and the cursor reaches the cross hairs instead, indicating that the aircraft has been "hit", the motion control computer 30 enters the shut down routine. The computer 28 can then display a message on screen 34 to indicate that the aircraft has been "hit" by the missile.

Movabel Counterweight

Referring to FIGS. 21–23, there is shown an alternate embodiment of the g-force trainer 10' for reducing peak power (torque) demands on the drive motor at start-up for high onset rates while preserving dynamic balance of the trainer. Trainer 10' is identical to trainer 10 already described with the exception of the counterweight. Trainer 10' includes pedestal assembly 12, arm 16, yoke 122 and gondola 18. Gondola 18 has a roll axis defined by pivot shafts 144, 144'. The trainer includes a swingable counterweight defined by a pair of swing arms 300, 302 mounted on a shaft 304 for rotation therewith. Shaft 304 is suitably journaled in bearings (not shown) in arm 16. The rotation axis 303 of shaft 304 is orthogonal to and intersects the rotation axis 305 of the driven shaft (154) which serves as the rotation axis for the trainer. A pair of identical counterweight masses 306, 308 are attached to the swing arms 300, 302 such that the center of gravity of the counterweight lies on the rotation axis 305 when the trainer is at rest.

At start-up for high onset rates, the power (torque) demands on the drive motor are normally the greatest. After start-up, less torque is required to attained a desired onset rate. Using a fixed counterweight design, such as counterweight 22 in FIG. 1, the inertia of the counterweight increases the motor power (torque) demands at start-up. In the trainer shown in FIGS. 21–23, however, the center of gravity of the counterweight lies on rotation axis 305 whereby the inertia of the counterweight is minimal when at rest. Accordingly, the peak power (torque) demands at start-up are reduced. This desirable feature is attained by the counterweight without sacrificing dynamic balance, especially at higher arm speeds. Thus, as arm 16 is accelerated about rotation axis 305, centrifugal force swings shaft 304 and arms 300, 302 in unison in the counterclockwise direction (FIG. 22) about rotation axis 303. The center of gravity of the counterweight therefore swings along an arcuate path about axis 303 (in a vertical plane designated 309 in FIG. 21) so as to dynamically balance the loaded arm 16.

Although a swingable counterweight has been described to move the counterweight center of gravity with respect to the trainer axis of rotation, it should be appreciated that other techniques for mounting the counterweight for movement with respect to the arm 16 are also contemplated by the invention. For example, the counterweight may be slideably mounted on arm 16 such that the counterweight center of gravity is displaceable between a position on or proximal the trainer axis of rotation (minimal counterweight inertia) to a distal position functionally equivalent to the extended position shown in FIG. 23 for balancing the arm.

Pilot Seat/Roll Axis Alignment

In conventional contribute of g-force trainer designs, the gondola includes a pilot chair which is positioned such that the pilot's heart is aligned with the gondola roll axis. As a result, the pilot's head swings rapidly (about the gondola roll axis) as the gondola pivots due to acceleration of arm 16. For example, for high onsets such as 6 $g_z$ per second the gondola can swing 50° in one second. Applicants have recognized that gondola roll acceleration creates an angular rotation and centrifugal force acting on the pilot's head and that this motion commonly stimulate a vestibular illusion of tumbling on the pilot's part. For this roll axis position, the semicircular canals of the ears (which acts as accelerometer sensors) sense an angular rotation followed quickly by a corresponding angular rotation in the opposite direction. At the same time, due to their displacement from the roll axis the otoliths of the ears (which respond primarily to linear acceleration forces) sense an abrupt acceleration followed immediately by a corresponding deceleration. The effect on the pilot is to "feel" as if he/she is tumbling head over heels. To applicants' knowledge, the role played by gondola roll axis location in producing pilot disorientation in a g-force trainer was not fully recognized heretofore.

In the present invention, it is preferred that the pilot be aligned with the gondola roll axis so that the axis intersects the pilot "between the eyes", i.e., at the elevation of the pilot's eyes midway between the otoliths. In this position, the semicircular canals of the ears sense an angular acceleration followed quickly by a corresponding deceleration. Since the otoliths of the ears are now located very near the axis of rotation, they experience minimum simulation. The net experience to the pilot is that the "tumbling" sensation is significantly reduced.

Referring to FIG. 24, there is shown a conventional pilot's chair 310 mounted in the gondola 18. The chair is supplied with built-in motor and (arm rest) switch control for altering the elevation of the set portion 312 with respect to the head rest 314. Such a chair is manufactured by the Martin-Baker Company and is commercially available. The chair is mounted in gondola 18 such that the head rest is intersected by the gondola roll axis defined by pivot shafts 144, 144'.

Preferably, the pilot is allowed to operate the chair switch control so as to adjust the seat elevation until the gondola roll axis intersects the pilot's head "between the eyes." Alignment can be achieved in a variety of ways. Indicia may be provided at the gondola interior so as to serve as reference pints indicating the position of the roll axis to the pilot. Alternatively, the CCTV camera can be utilized to achieve the desired alignment. The camera can be supplied with cross-hairs centered in the camera's field of view and aimed at a zone in front of the head rest. The zone would be located along the gondola roll axis at a location anticipated to coincide with the mid-point between the pilot's eyes. Still further, as shown in FIG. 24, as collimated light source 316 can be mounted in the gondola so as to direct a visible light beam 318 along the gondola roll axis. During seat adjustment, A CCTV camera can be viewed to determine when the pilot's head intersects the light beam "between" the pilot's eyes.

Freewheeling Arm Safety Coupling

Referring to FIGS. 24-27 there is shown a freewheeling arm safety coupling 300 for coupling the driven shaft 154 to the arm 16. Safety coupling 300 is intended as an alternative to, and in replacement of, the compression disks 156 (FIG. 4) which directly couple hub 14 to driven shaft 154. The safety coupling includes an arm 302 staked to the top end portion of driven shaft 154 by pins 304 and fastened to the shaft by a hex bolt 306 located at the shaft center-line.

A shear pin 308 is staked to arm 302. The shear pin is fixed in bushings 310, 312 which are mounted in a clevis type support 314. Support 314 is welded to a plate 316 which is fixed by hex bolts 318 to the trainer arm (not shown). The trainer arm is secured to the hub 14 as previously described (FIG. 5), but the hub is no longer coupled to the driven shaft 154 by compression disks 156. Instead, the hub is coupled to the driven shaft by the safety coupling 300 whereby eliminating of the safety coupling would leave the hub free to rotate on the driven shaft around the shaft center-line.

The shear pin 308 is grooved as at 320, 322 so as to weaken the pin at the clearances between support 314 and arm 302. In this manner, the shear pin is designed to break away from support 314 at a predetermined stress level corresponding to abrupt starts on stops of the arm which might otherwise endanger the structural integrity of the arm, yoke and gondola and threaten injury to the pilot. Thus, pin 308 is a break-away pin which is designed to fracture at the grooves 320, 322. To prevent the pin from flying away at fracture, the pin is bolted to arm 302 as to 324.

Should the arm 16 be subjected to abrupt starts or stops (due for example to malfunction of the drive motor or any of the motor control hardware or software) which might endanger the structural integrity of the trainer components, shear pin 308 will fracture at both grooves 320, 322 thereby de-coupling safety arm 302 and support 314 hence driven shaft 154 and trainer arm 16. Accordingly, hub 14 and arm 16 can coast to a stop under its own inertia, independent of driven shaft 154. The driven shaft can be brought to a stop separately by shuttling down the drive motor.

The present invention may be embodied in other specific forms without departing from the spirit or essential attributes thereof and, accordingly, reference should be made to the appended claims, rather than to the foregoing specification, as indicating the scope of the invention.

We claim:

1. G-force trainer including an assembly for rotation about a vertical shaft, the assembly comprising:
   a tubular arm secured to the shaft for rotation therewith about an axis of the shaft;
   a yoke secured to said arm;
   a gondola mounted at said yoke so as to rotate therewith about the shaft axis and to roll freely about a roll axis in proportion to speed of rotation of said arm about the shaft axis, the roll axis being, about twenty feet or more from the shaft axis; and
   support means within the gondola for receiving a human passenger, the total rotational weight of the assembly being about 10,000 lbs. or less.

2. G-force trainer of claim 1 further comprising prime mover means coupled with said shaft for rotating the assembly, said prime mover means having a maximum output less than 1,000 hp. for accelerating a pilot in the gondola of the assembly from an initial, nonzero rotational speed less than 47 rpm at on onset rate of 6 g/sec. or more.

3. G-force trainer including an assembly for rotation about a vertical shaft, the assembly comprising:
   a tubular arm secured to the shaft for rotation therewith about an axis of the shaft;
   a yoke secured to said arm;
   a gondola mounted at said yoke so as to rotate therewith about the shaft axis and to roll freely about a roll axis in proportion to speed of rotation of said arm about the shaft axis, the roll axis being about twenty feet or more from the shaft axis; and
   support means within the gondola for receiving a human passenger, the total moment of inertia of the assembly with respect to the shaft axis being about one million lb-ft$^2$ or less.

4. G-force trainer of claim 3 wherein the gondola has a moment of inertia with respect to the shaft axis greater than the moment of inertia of the remainder of the rotating system with respect to the shaft axis.

5. G-force trainer according to claim 1 or claim 3 wherein said tubular arm is provided with means for resisting deflection of said arm comprising a series of gusset plates secured to said arm and arranged in a zig-zag pattern inside said arm between said hub and yoke.

6. G-force trainer according to claim 5 wherein said means for resisting deflection includes a bracket disposed at an interior corner of said tubular arm, said bracket and arm corner forming a wire conduit.

7. G-force trainer according to claim 1 or 3 wherein the walls of said tubular arm are approximately 0.09-0.125 inch thick stainless steel.

8. G-force trainer according to claim 1 or claim 3 including a hub adapted to slideably mount on an end of said shaft and secured to said shaft by means of a compression disk, said tubular arm being secured to said shaft by said hub.

9. G-force trainer according to claim 8 wherein said arm is secured to said hub by means of a pair of vertically spaced support members secured to the hub, an end of said arm adjacent said hub being telescoped over said support members and secured thereto.

10. G-force trainer according to claim 9 wherein a counterweight is secured to the end of said arm adjacent said hub, said gondola and counterweight being located on opposite sides of the hub central axis.

11. G-force trainer according to claim 1 or claim 3 wherein said arm comprises at least two telescoped hollow tubular arm sections secured to each other, each arm section having a uniform wall thickness, the uniform wall thickness of each arm section being greater than the uniform wall thickness of the next adjoining, radially outwardly positioned tubular arm section.

12. G-force trainer according to claim 11 wherein each tubular arm section has a substantially uniform rectangular cross section and comprises a pair of elongate channel shaped member secured to each other.

13. G-force trainer, comprising:
a shaft having a vertical longitudinal axis,
means for driving the shaft about its axis in response to motion control signals,
an arm secured to the shaft for rotation therewith about the shaft axis,
a gondola having a center of gravity and mounted on said arm so as to rotate therewith about the shaft axis and to roll the center of gravity about a roll axis under centrifugal force from the vertical to an angle determined by speed of rotation of said arm about said shaft axis,
a visual display and a pilot operable joystick, at said gondola,
computer means programmed for producing said motion control signals in real time based on operation of said joystick,
computer means programmed for operating said visual display to display thereon a target image and on index image based on stored date and to vary the relative positions of the target image and index image on the visual display according to said stored data and said joystick operation.

14. Missile avoidance trainer, comprising:
a shaft having a vertical longitudinal axis,
means for driving the shaft about its axis in response to motion control signals,
an arm secured to the shaft for rotation therewith about the shaft axis,
a gondola having a center of gravity and mounted on said arm so as to rotate therewith about the shaft axis and to roll the center of gravity about a roll axis under centrifugal force from the vertical to an angle predetermined by speed of rotation of said arm about said shaft axis,
a visual display and a pilot operable joystick at said gondola,
computer means programmed for producing motion control signals in real time based on operation of said joystick, computer means programmed for operating said visual display to display thereon an image representing the location of a missile based on stored data,
a said first mentioned computer means being further programmed for determining whether said missile has been evaded based on said stored data and said joystick operation.

15. Trainer according to claim 13 or claim 14 including a second, visual display means for producing a signal indicative of actual g force at said gondola, and computer means programmed for operating said second display to display thereon in real time an advancing line image representing actual g force at said gondola based on said last-mentioned signal.

16. G-force trainer, comprising:
a shaft having a vertical longitudinal axis,
means for driving said shaft about its axis in response to motion control signals,
an arm secured to the shaft for rotation therewith,
a gondola having a center of gravity and mounted on said arm so as to rotate therewith about the shaft axis and to roll the center of gravity about a roll axis under centrifugal force from the vertical to an angle determined by speed of rotation of said arm about said shaft axis,
a visual display;
means for producing a signal indicative of actual g force at said gondola,
computer means programmed for producing motion control signals based on stored date representative of desired g force at the gondola,
computer means programmed for operating said display to display thereon a fixed line image representing desired g force t said gondola as a function of time according to said stored data and an advancing line image representing actual g force at said gondola in real time based on said last-mentioned signal.

17. G-force trailer according to claim 16 including a visual display and a pilot operable joystick at said gondola, and computer means programmed for operating said last-mentioned visual display to display thereon a target image and an index image based on stored data and to vary the relative position of the target image and index image on the visual display according to said stored data and said joystick operation.

18. G-force trainer, comprising:
a shaft having a vertical longitudinal axis,
means for driving said shaft about its axis in response to motion control signals,
an arm secured to the shaft for rotation therewith,
a gondola having a center of gravity and mounted on said arm so as to rotate therewith about the shaft axis and to roll the center of gravity about a roll axis under centrifugal force from the vertical to an angle determined by speed of rotation of said arm about said shaft axis,
a visual display,
a manually operable control device at a remote location with respect to the gondola,
computer means programmed for producing said motion control signals in real time based on operation of said manually operable control device,
means for producing a signal indicative of actual g force at the gondola,
computer means programmed for operating said visual display to display thereon in real time an advancing line image representing actual force at said gondola based on said last-mentioned signal.

19. G-force trainer, comprising:
a shaft having a longitudinal axis,
means for driving said shaft about its axis in response to motion control signals,
an arm secured to said shaft for rotation therewith,
a gondola mounted at said arm so as to rotate therewith about the shaft axis and roll about a roll axis in proportion to the speed of rotation of the arm about the shaft axis,
recorder means disposed at a remote location with respect to said gondola for recording data signals,
sensor means located at said gondola for sensing physiologic characteristics of a pilot and for producing data signals based thereon, computer means mounted at the gondola for processing said last-mentioned data signals, computer means for causing said recorder means to record the processed data signals, means for generating signals representative of desired g force at the gondola, and computer means for producing said motion control signals based on said signals representative of said desired g force.

20. G-force trainer, comprising:

a shaft having a vertical longitudinal axis, means for driving said shaft about its axis in response to motion control signals, an arm secured to said shaft for rotation therewith, a gondola having a center of gravity and mounted on said arm so as to rotate therewith about the shaft axis and to roll the center of gravity about a roll axis under centrifugal force from the vertical to an angle determined by speed of rotation of said arm about said shaft axis, a pilot operable joystick at said gondola, a manually operable control device displayed at a remote location with respect to said gondola, computer means programmed to selectably operate in any of a profile mode, a manual mode and a pilot mode for producing said motion control signals in real time, said motion control signals being based on stored data representative of desired $g_z$ values in said profile mode or on operation of said manually operable control device in said manual mode or on operation of said joystick in said pilot mode, and keyboard means coupled with said computer means for selecting operation of said computer means in said profile mode, said manual mode or said pilot mode.

21. G-force trainer according to claim 20 including means for sensing the roll angle of said gondola about said roll axis and for producing a signal based thereon a visual display at said gondola, and computer means programmed for operating said visual display in real time based on said last-mentioned signal to provide an indication of said roll angle.

22. G-force trainer according to claim 20 including a visual display at a remote location with respect to said gondola, means for producing a signal representative of actual g force at said gondola, and computer means programmed for operating said last-mentioned display to display thereon a fixed line image a representing desired g force at said gondola as a function of time based on said stored data and an advancing line image representing actual g force at said gondola in real time based on said last-mentioned signal.

23. G-force trainer, comprising:

a shaft having a longitudinal axis, means for driving the shaft about its axis in response to motion control signals, an arm secured to the shaft for rotation therewith about the shaft axis, a gondola mounted on said arm so as to rotate therewith about the shaft axis and roll about a roll axis in proportion to the speed of rotation of said arm about said shaft axis, a counterweight pivotably mounted on said arm so as to be displaceable form a rest position wherein the center of gravity of the counterweight lies near or on the axis of rotation of said shaft to a extended position wherein the center of gravity of the counterweight is spaced from the axis of rotation of the shaft.

24. G-force trainer according to claim 23 wherein said counterweight includes a shaft mounted on said arm, a pair of swing arms mounted on said last mentioned shaft so as to pivot about the axis thereof, and a pair of counterweight masses secured to said swing arms.

25. G-force trainer, comprising:

a shaft having a vertical longitudinal axis, means for driving the shaft about its axis in response to motion control signals, an arm secured to the shaft for rotation therewith about the shaft axis, a gondola having a center of gravity and mounted on said arm so as to rotate therewith about the shaft axis and to roll the center of gravity about a roll axis under centrifugal force from the vertical to an angle determined by speed of rotation of said arm about said shaft axis, means for positioning a pilot inside the gondola at least generally facing a direction of travel of the gondola along a tangent line with the pilot's head intersected by said roll axis whereby pilot disorientation due to motion about said gondola roll axis is substantially reduced.

26. G-force trainer according to claim 25 wherein said means for positioning a pilot inside the gondola positions the pilot such that the pilot's head is intersected by said roll axis between the pilot's eyes.

27. G-force trainer according to claim 25 wherein said means for positioning the pilot includes a chair having a head rest portion and said chair being adjustable in elevation to position said head rest portion along said roll axis.

28. G-force trainer according to claim 25 wherein said means for positioning the pilot includes a collimated light source mounted in the gondola for producing a visible light beam aimed at a region to be occupied by the pilot's head.

29. G-force trainer according to claim 25 wherein said means for positioning the pilot includes a video camera mounted in the gondola and having a cross-hairs aimed at a region to be occupied by the pilot's head.

30. Method of operating a g-force trainer having a shaft with a vertical longitudinal axis, an arm secured to the shaft for rotation therewith about the shaft axis, and a gondola having a center of gravity and mounted on the arm to rotate therewith about the shaft axis and to roll the center of gravity about a roll axis under centrifugal force from the vertical to an angle determined by speed of rotation of the arm and the gondola about the shaft axis, comprising:

positioning a pilot inside gondola generally facing a direction of travel of the gondola along a tangent line with the pilot's head intersecting the roll axis, and driving the shaft about its axis such that the gondola rolls about the roll axis under centrifugal force whereby pilot disorientation due to motion about the gondola roll axis is substantially reduced.

31. G-force trainer, comprising:

a shaft having a longitudinal axis;

means for driving the shaft about its axis in response to motion control signals, an arm, a gondola mounted on said arm so as to rotate therewith about the shaft axis and roll about a roll axis in proportion to the speed of rotation of said arm about said shaft axis, safety means for securing said arm to said shaft for rotation therewith about the shaft axis and for decoupling said arm and shaft if the stresses impressed on said safety means reach a predetermined level.

32. G-force trainer according to claim 31 including a hub slideably mounted on an end of said shaft for independent rotation with respect to the shaft, said arm being secured to said hub.

33. G-force trainer according to claim 31 herein said safety mans includes a safety arm secured to said shaft, a support secured to the arm on which the gondola is mounted, and a shear pin coupling the safety arm to the support.

34. G-force trainer according to claim 33 wherein said shear pin is weakened at a predetermined location so as to fracture therealong whereby said safety arm and support are decoupled.

35. G-force trainer including an assembly for rotation about a vertical shaft, the assembly comprising:
an arm secured to the shaft for rotation therewith about an axis of the shaft;
a yoke secured to said arm;
a gondola having a center of gravity and mounted at said yoke so as to rotate therewith about the shaft axis and to roll the center of gravity about a roll axis under centrifugal force from the vertical to an angel determined by speed of rotation of said arm about said shaft axis, the roll axis being about twenty feet or more from the shaft axis; and
means for positioning a pilot inside the gondola such that the pilot's head is proximal the roll axis and the roll axis is closer to the pilot's head than to the pilot's torso.

36. G-force trainer of claim 35 further comprising prime mover means coupled with the vertical shaft for rotating the assembly and accelerating a pilot in the gondola at an onset rate of 6 g/sec. or more from at least one nonzero rotational speed of the assembly about the shaft.

37. G-force trainer according to claim 36 wherein the prime mover means outputs less than 1,000 hp. to accelerate the assembly with pilot at an onset rate of at least 6 g/sec. from the one nonzero rotational speed.

38. G-force trainer of claim 37 wherein the total moment of inertia of assembly with respect to the vertical a shaft axis is about 1,000,000 lb-ft$^2$ or less.

39. G-force trainer of the claim 36 wherein the means for positioning a pilot inside the gondola positions the pilot such that the pilot's head is intersected by the roll axis approximately between the pilot's eyes.

* * * * *